(12) United States Patent
Tennant et al.

(10) Patent No.: US 10,739,911 B2
(45) Date of Patent: Aug. 11, 2020

(54) UNIFIED DRAWING FRAMEWORK

(71) Applicant: Apple Inc., Cupertino, CA (US)

(72) Inventors: Brandon M. Tennant, Sunnyvale, CA (US); Conrad R. Carlen, Burlingame, CA (US); Bradley W. Griffin, Berkeley, CA (US); William J. Thimbleby, Santa Clara, CA (US); Patrick O. Heynen, Redwood City, CA (US); Ryan S. Dixon, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 449 days.

(21) Appl. No.: 14/872,080

(22) Filed: Sep. 30, 2015

(65) Prior Publication Data

US 2017/0090672 A1 Mar. 30, 2017

(51) Int. Cl.
*G06F 3/041* (2006.01)
*G06F 3/0488* (2013.01)

(52) U.S. Cl.
CPC ........ *G06F 3/0418* (2013.01); *G06F 3/04883* (2013.01)

(58) Field of Classification Search
CPC ........ G06F 3/041; G06F 3/013; G06F 3/0488; G06F 3/0354; G06F 3/0418
See application file for complete search history.

(56) References Cited

U.S. PATENT DOCUMENTS

| | | | | |
|---|---|---|---|---|
| 2009/0256817 A1* | 10/2009 | Perlin | ............. | G06F 3/0233 345/174 |
| 2011/0164041 A1* | 7/2011 | Miura | ............. | G06T 11/203 345/442 |
| 2012/0194444 A1* | 8/2012 | Chang | ............. | G06F 3/04883 345/173 |
| 2014/0078087 A1* | 3/2014 | Ho | ............. | G06F 3/0412 345/173 |
| 2015/0091832 A1* | 4/2015 | Mizunuma | ............. | G06F 3/0488 345/173 |
| 2015/0371417 A1* | 12/2015 | Angelov | ............. | G06Q 10/101 345/442 |
| 2016/0041689 A1* | 2/2016 | Yumoto | ............. | G06F 3/0418 345/174 |
| 2016/0162061 A1* | 6/2016 | Worfolk | ............. | G06T 11/203 345/173 |
| 2016/0357429 A1* | 12/2016 | Nilo | ............. | G06F 3/0416 |

* cited by examiner

*Primary Examiner* — William Boddie
*Assistant Examiner* — Andrew B Schnirel
(74) *Attorney, Agent, or Firm* — Womble Bond Dickinson (US) LLP

(57) ABSTRACT

A method of emulating an input device. The method receives a set of data associated with a touch input. The set of data includes a set of coordinates of each data point, the force applied at each data point, and the time the data for each data point is received. The method adds several data points to the first set of data points to create a second set of data points. For each data point in the second set of data points, the method calculates a set of parameters based on the set of data associated with the data point. The method provides a subset of the calculated parameters and the data associated with a subset of the second set of data to an application to emulate the input device.

20 Claims, 19 Drawing Sheets

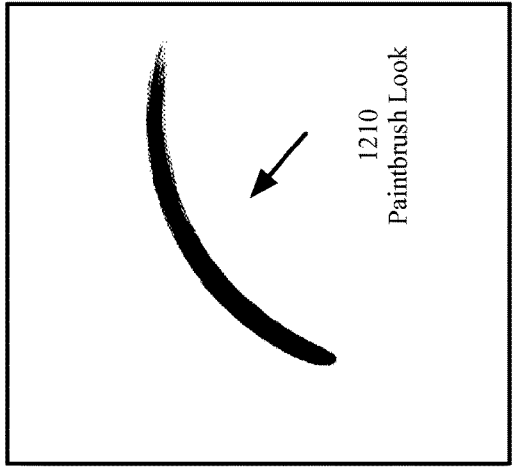
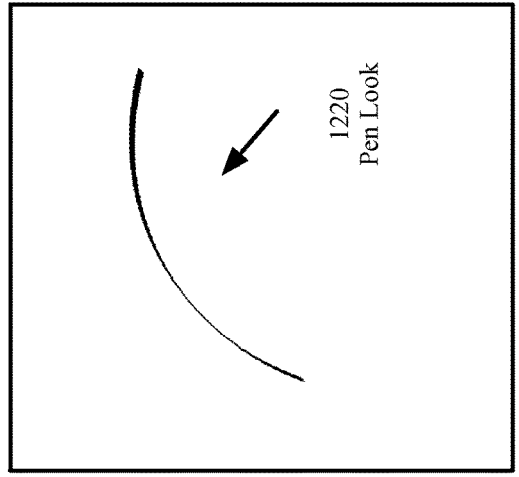
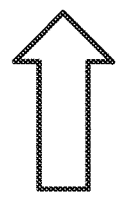
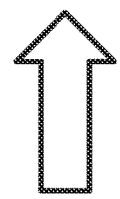
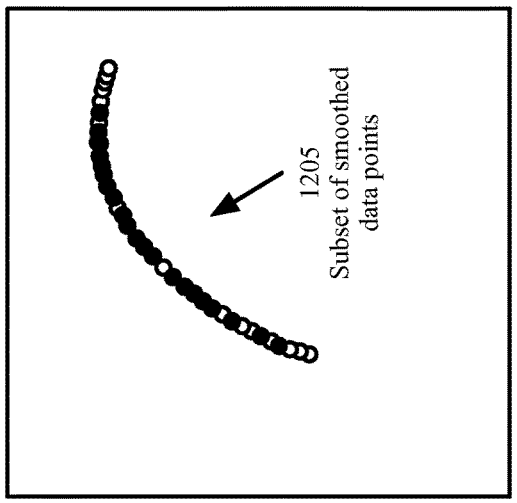
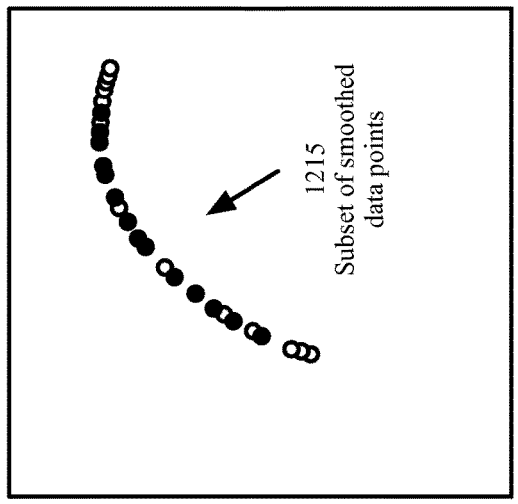
Fig. 12A
Fig. 12B

UNIFIED DRAWING FRAMEWORK

BACKGROUND

Touch inputs are received from input devices such as touchpads or touchscreens to enter input by touching the screen with fingers or a stylus pen. Touchpads (or trackpads) use one or more sensors to translate a person's fingers position or movement to relative positions that are input to the device. Touchscreens are display screens that are also used as input devices. Touchscreens are typically covered by a touch sensitive material that either creates an electric current or a charge when touched. The resulting electric current or charge is sensed and processed as the user input.

Receiving a touch input and displaying or storing the results is used in applications such as entering logographic alphabets for Chinese handwriting, writing notes, inputting signatures, etc. However, since different touch sensitive devices have different technology and different touch sensitivities, the user experience is often not uniform across multiple devices.

BRIEF SUMMARY

Some embodiments provide a unified drawing framework that integrates touch prediction and force to generate a consistent input experience across different applications and different platforms. In these embodiments, a touch input to draw a character, a shape, or a signature on any device such as smartphone, touchpad, or watch creates the same shape and the same experience. The same pen or brush feel is uniformly emulated across different devices with different screen sizes and resolutions.

Several parameters such as coordinates, force, and temporal parameters for touch points are sampled. Other parameters such as speed and acceleration are computed from the sampled input. The sample data is pre-processed to provide additional data to fit in a smooth curve to create a certain look. The data is then further processed to select a subset of data that is required to create a final feel (e.g., to emulate a pen or a paintbrush).

Different embodiments use different techniques to provide additional data to complement the sampled data. Some embodiments use the sampled data to create a mathematical formula (or a vector) to generate a curve. Other embodiments generate a set of discrete (or rasterized) individual data points to generate a set of vertices to follow the movement of the touch input on a touch sensitive screen. The data points for the set of vertices or the mathematical formula is further refined based on the particular application that is used to display the data. The refined data is sent to each application, for example through an API, to render the final output.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 12A and 12B conceptually illustrate providing different subsets of smoothed data to different applications to create different looks.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed. For instance, many of the figures in this application are described with respect to a particular number of devices for the purposes of simplicity and/or explanation. One of ordinary skill in the art will realize the invention is not limited to the number of devices illustrated in these figures and that the invention may be practiced with any number of different devices.

I. Application Programming Interface for a Uniform Drawing Framework

Figure 1:
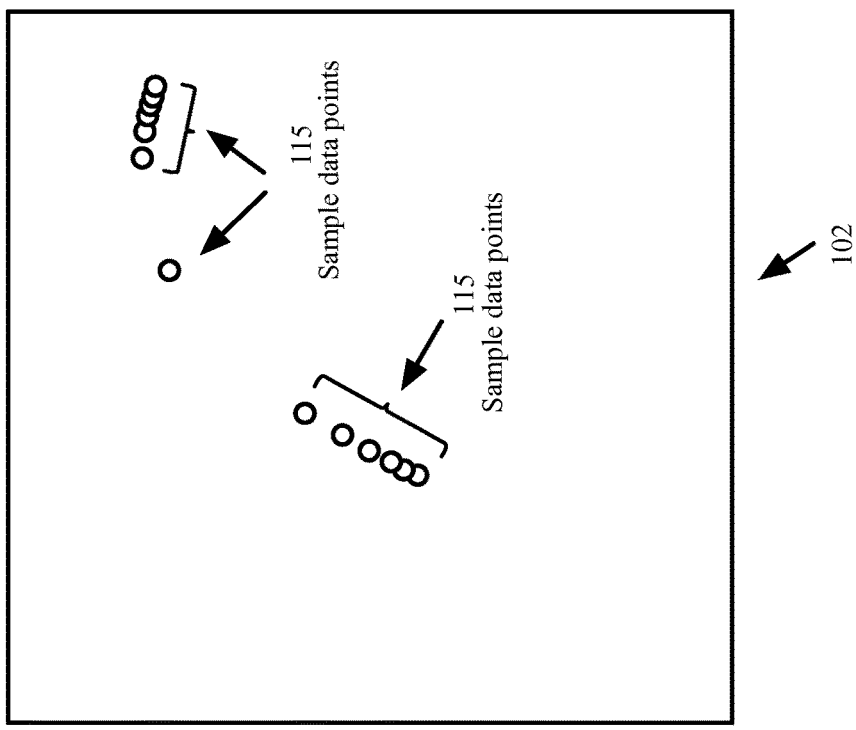
FIG. 1 conceptually illustrates receiving a touch input and taking digitized samples for the touch input in some embodiments.
Figure 1:
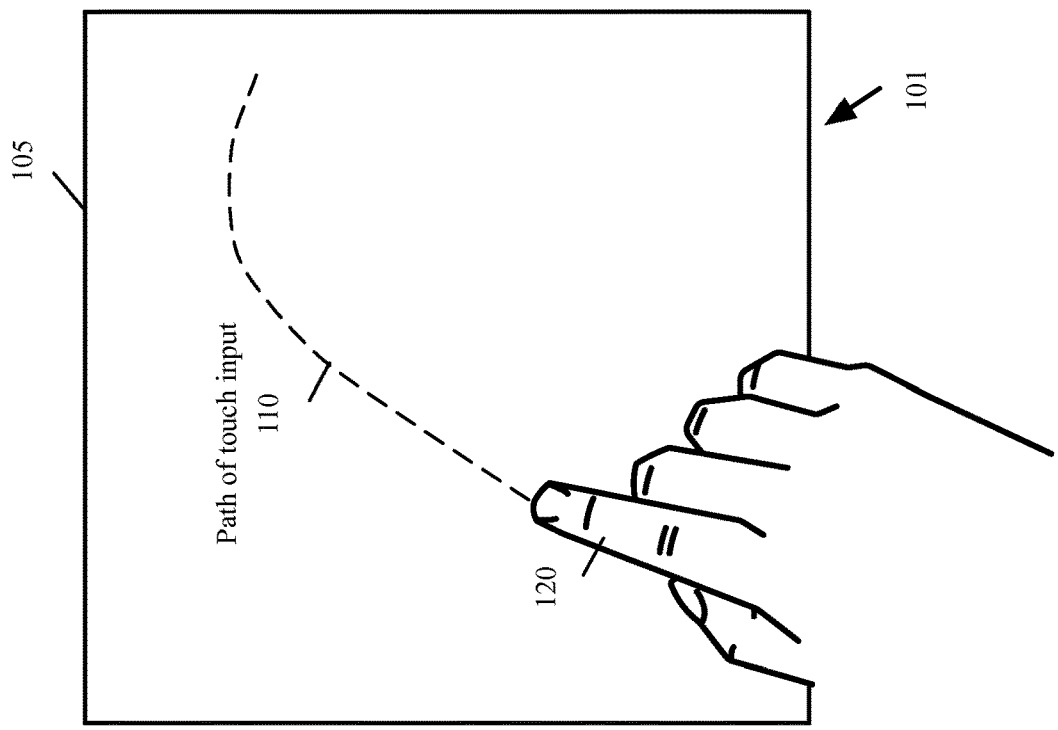

Some embodiments provide an application programming interface that receives sampled data points for a touch input device and provides a set of processed data points to one or more applications to emulate different behaviors and looks for the received touched input. FIG. 1 conceptually illustrates receiving a touch input and taking digitized samples for the touch input in some embodiments. The figure is shown in two stages 101 and 102. In stage 101, a user provides touch input. For instance, the user places a finger 120 on a touch input device 105 (such as a touchpad or touchscreen) and moves the finger access a path 110 on the touch input device 105.

The touch input device 105 receives a user's touch input (e.g., as the movement of a finger or a stylus on the touch input device). Depending on the technology used in the touch input device, the user's touch input generates a stimulus such as an electrical current or charge in one or more sensors in the touch input device. The stimulus is then converted to digitized sample data for parameters such as coordinates and force. In addition, the temporal parameters (such as the time each sample is taken) are also recorded to determine the interval between successive samples.

Stage 102 shows the digitized sample data points 115 that are taken along the path of the touch input 110. As shown, even if the touch input samples are taken at regular intervals, the user may enter the touch input by varying speed or acceleration. For instance, the user may accelerate when drawing curves or slow down when going around corners. As a result, the samples are taken at irregular intervals along the touch input 110.

Figure 2:
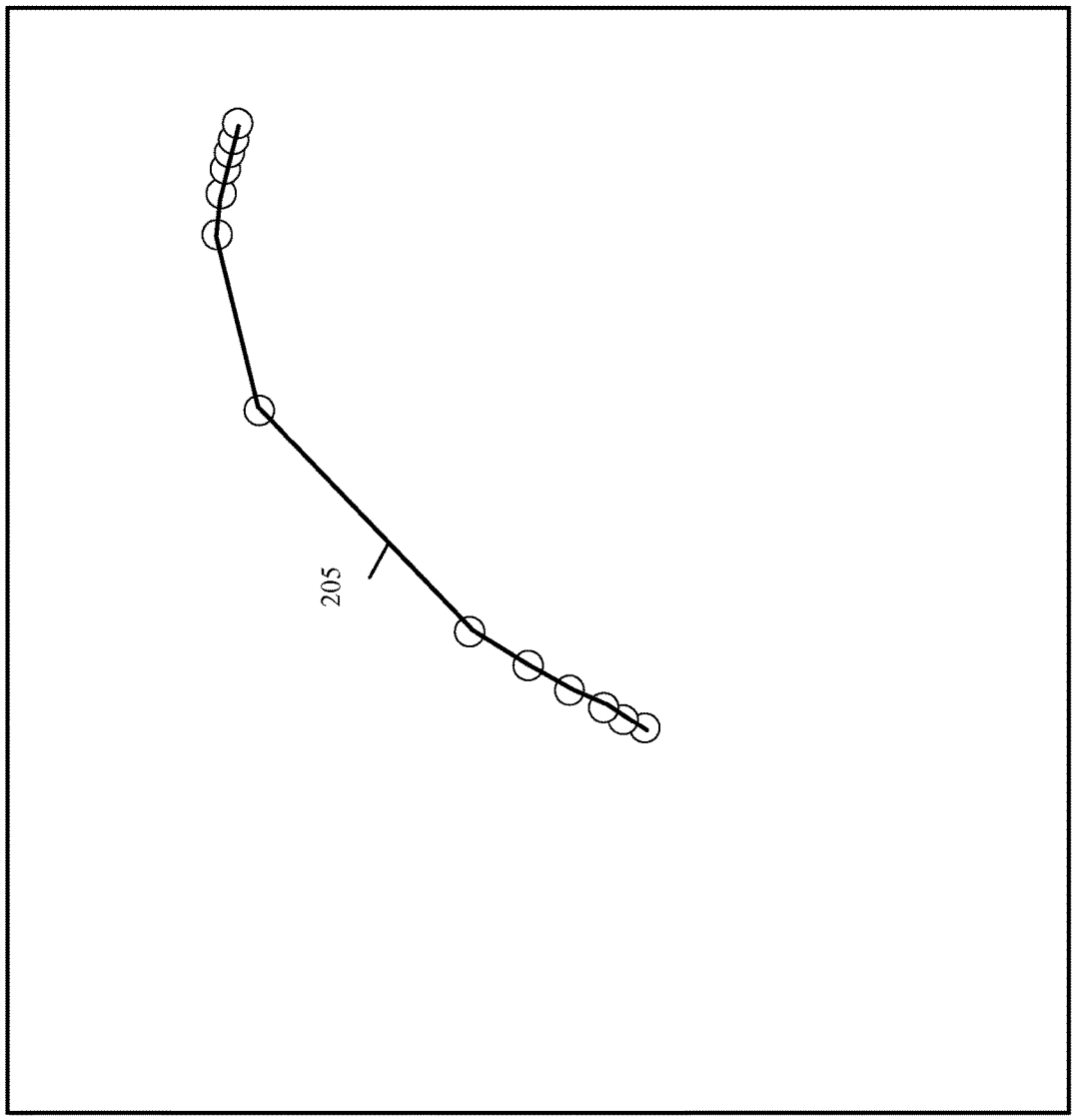
FIG. 2 illustrates a curve that is resulted from connected the sampled points in FIG. 1.

A simple interpolation of the sample generates an undesired visual effect. For instance, FIG. 2 illustrates a curve 205 that is resulted from connecting the sampled points 115 in FIG. 1. Some embodiments smooth the input samples by adding additional points as well as moving or deleting some samples to remove the outliers.

A. Smoothing of Sampled Data Points

Figure 3:
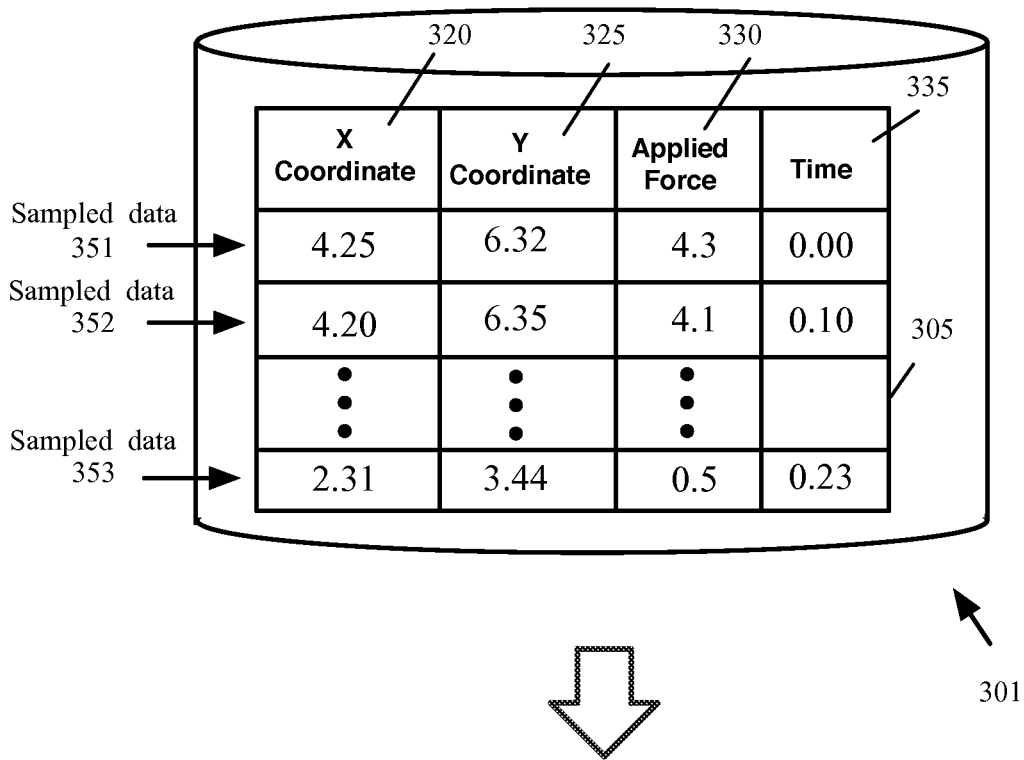
FIG. 3 conceptually illustrates smoothing digitized samples of a touch input by adding additional data points and removing the effects of the outliers in some embodiments.
Figure 3:
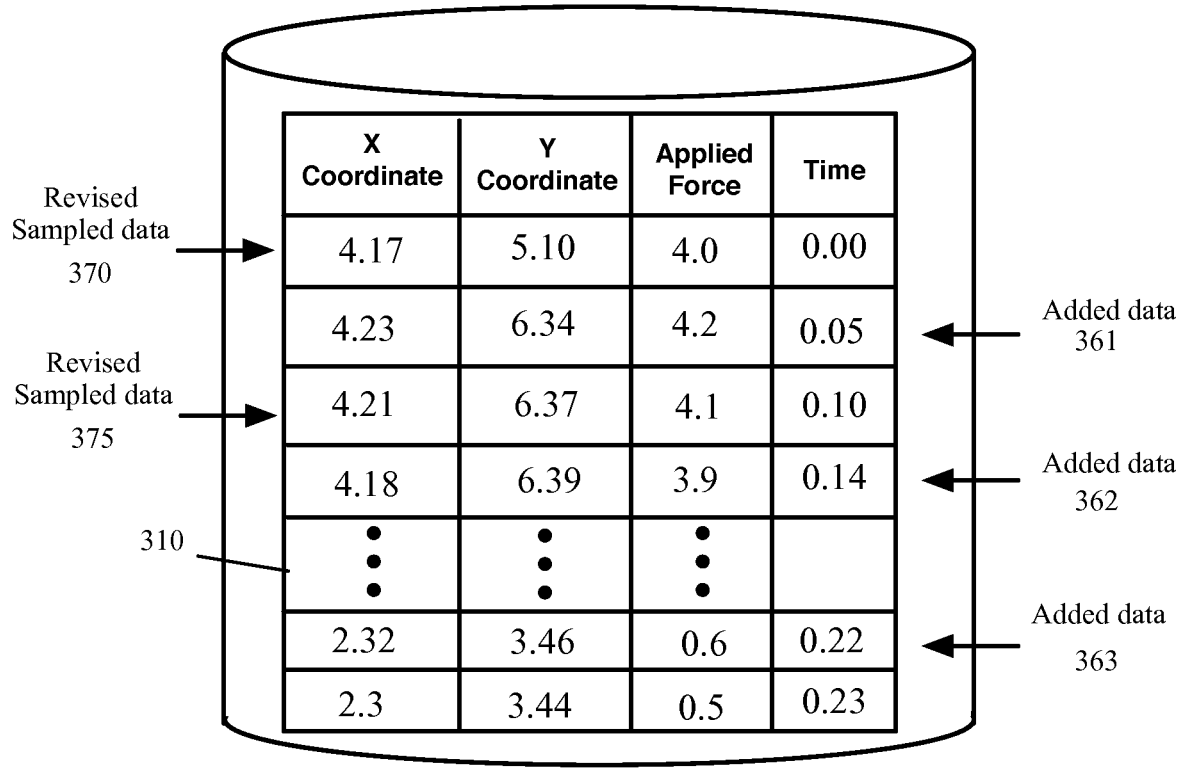

FIG. 3 conceptually illustrates smoothing digitized samples of a touch input by adding additional data points and removing the effects of the outliers in some embodiments. The figure is shown in two stages 301 and 302. Stage 301 shows an example of the digitized samples 351-353 that are taken for a touch input in some embodiments. The sampled data is converted to values for different parameters. In the example of FIG. 3, the parameters include the x and y coordinates 320-325, the applied force 330, and the time 335 (either absolute or relative) when each sample was taken. The results are stored in a data structure such as table 305.

Stage 302 shows the smoothed samples. As shown, several additional samples 361-363 are calculated and added to the samples that are actually taken by the touch input device. In addition, some sample data may be changed or deleted to further smooth the samples. For instance, sample data 351 and 352 of stage 301 are modified in stage 302 to smooth the overall samples. As shown, the x and y coordinates of the revised sample data 370 and 375 are changed in stage 302. The smoothed samples are stored in a data structure such as table 310.

Some embodiments smooth the sampled data in a two-pass pipeline. In the first pass an averaging filter is applied to each group of sampled data as the sampled data arrives. The averaging filter averages a set of n samples as the samples arrive over time. For instance, the averaging filter uses a window of three samples to averages the first three sampled data to generate a first averaged sampled data. The filter then averages the second to fourth sampled data to generate a second averaged sampled data and so on. In this example, the $i^{th}$ averaged sampled data is generated by averaging the $i^{th}$ through $(i+n)^{th}$ sampled data, where n is the size of the sampling window.

In the second pass of the pipeline, a quadratic formula is applied incrementally and in a piecewise fashion to the averaged data generated by the averaging filter. A set of quadratic curves is generated from each group of n (e.g., three) adjacent averaged data points. These quadratic curves are used to generate continuous sections of a larger curve that is generated based on all averaged sampled data points. Each quadratic curve is used as a single interpolated segment to generate additional intermediate data points to further smooth the averaged sampled data points.

In some embodiments, additional data point values are synthesized in order to create a segment of a quadratic curve between two endpoints of a single interpolated segment. For instance, with a set of three generated averaged data points, an interpolated segment is created in some embodiments from the first generated averaged data point to the synthesized midpoint of the line defined by the second and third averaged data generated points. As newly generated averaged data points arrive, creation of additional interpolated segments continues and defines a smooth, continuous path.

The following quadratic equation (1) is an example of a quadratic equation used in some embodiments:

$$P_{interp}=P_0(1-t)^2+P_1(2t-2t^2)+P_2(t^2), 0=<t=<1 \qquad (1)$$

where t is time, which is normalized between 0 and 1; and $P_{interp}$ is a data point interpolated from data points $P_0$, $P_1$, and $P_2$.

Figure 9:
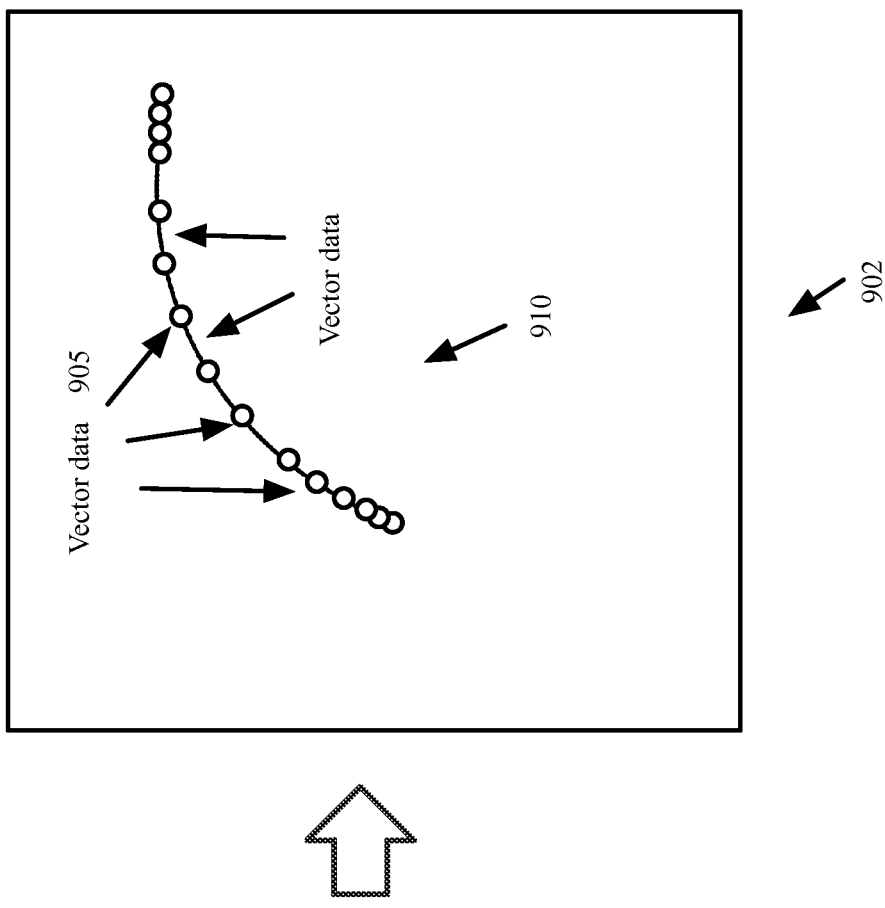
FIG. 9 conceptually illustrates converting digitized samples of a touch input into vector data and providing the vector data to an application through an API in some embodiments.
Figure 9:
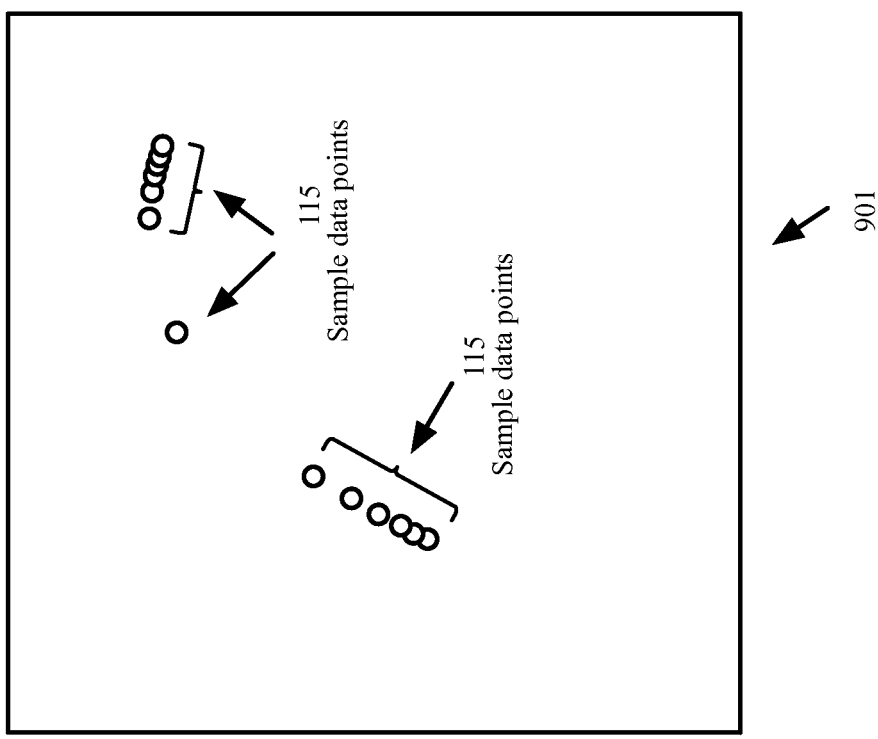

Equation (1) is utilized to compute additional interpolated data points to smooth the sampled data between averaged sampled data $P_0$ and $P_2$. The same process is repeated for the next two adjacent averaged sampled data to generate the next quadratic curve. These quadratic curves are used to generate continuous sections of a larger curve based on all averaged sampled data points. As described further below by reference to FIGS. 9 and 10, the quadratic curves for each section are used to either generate a set of rasterized smoothed data points (FIG. 10) or a set data points and the associated quadratic formulas to generate a set of vector data points (FIG. 9).

In order to generate additional interpolated data points, equation (1) requires the time "t" to be divided into sufficiently discrete units to produce the required number of intermediate interpolated points (e.g., a default number of intermediate points or a number of intermediate points required by a client application) for each quadratic curve. One mechanism to determine the number of intermediate interpolated points is to approximate the length of the arc for the segment of the quadratic curve from which the interpolated points are being generated.

Figure 17:
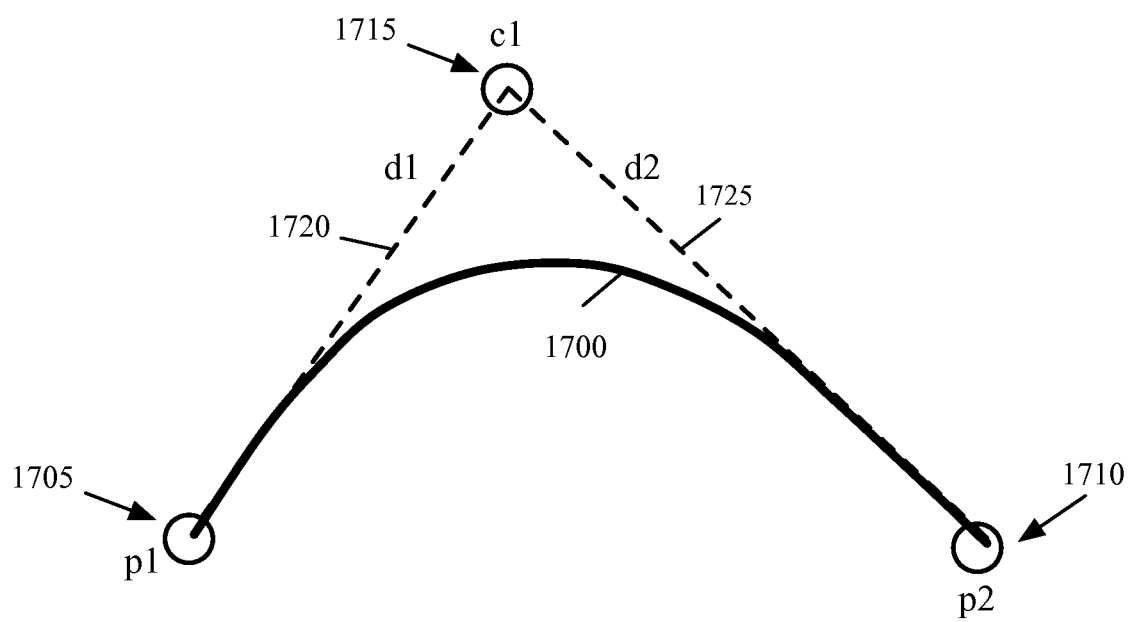
FIG. 17 conceptually illustrates a quadratic curve used to generate additional data points to smooth the sampled data points in some embodiments.

FIG. 17 conceptually illustrates a quadratic curve used to generate additional data points to smooth the sampled data points in some embodiments. In this example, point p1 1705 is an averaged sampled data point and point p2 1710 is the center of the line between the next two averaged data points. The length of the quadratic curve 1700 between points 1705 and 1710 is approximated from the length of two lines d1 1720 and d2 1725. In this example, line d1 1720 is tangent to curve 1700 at point p1 1705 and line d2 1725 is tangent to curve 1700 at point p2 1710. The two lines intersect at a point c1 1715. The following pseudocode shows one example for determining the number data points based on the length of arc 1700 and calculating the intermediate data points:

```
//Compute maximum arc distance of the curve
//The "vector_distance" function receives coordinates of
two points and calculates the distance
//between them
const float d1=vector_distance (p1.xy, c1.xy);
const float d2=vector_distance (c1.xy, p2.xy);
//
//Compute minimum number of interpolated points to dis-
play along the curve const float resolution=(d1+d2);
//
//Compute all intermediate interpolated points
//The "interpolate" function applies quadratic equation (1) to
its input arguments
//From quadratic equation (1): P0=p1, P1=c1, P2=p2, t=t for
(int t=0; t<resolution; t++) {
    const vector_float4 Pinterp=interpolate (p1, c1, p2, t);
}
```

Figure 4:
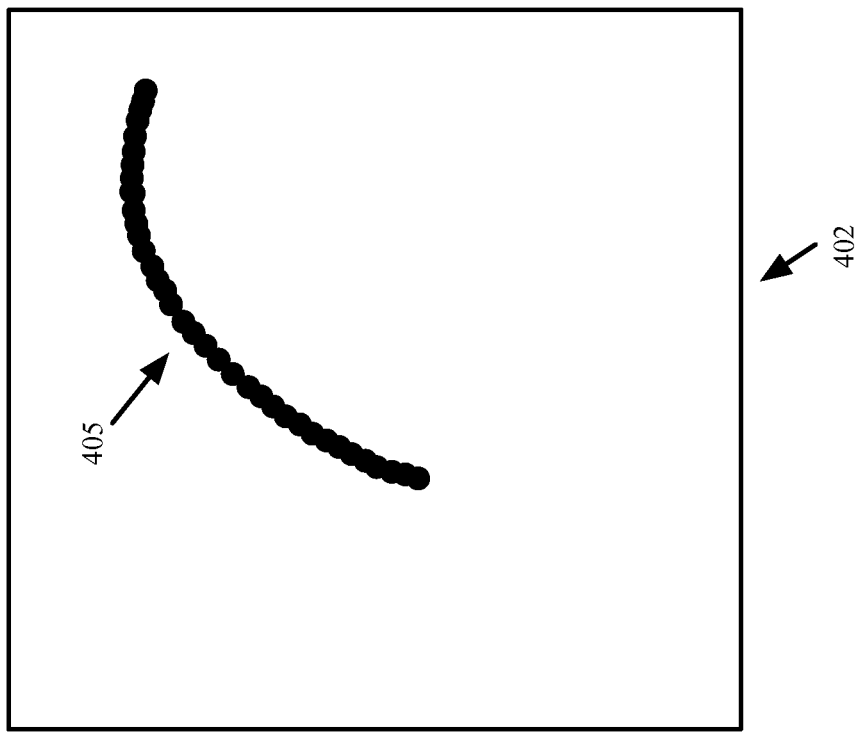
FIG. 4 conceptually illustrates smoothed digitized touch input samples in some embodiments.
Figure 4:
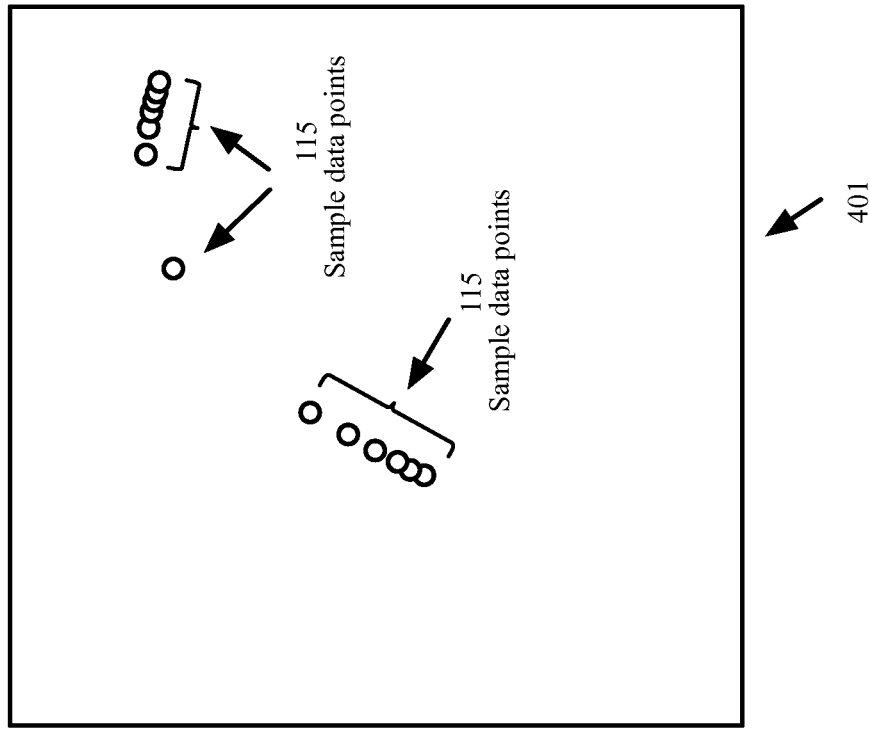

FIG. 4 conceptually illustrates smoothed digitized touch input samples in some embodiments. The figure is shown in two stages 401 and 402. Stage 401 is similar to stage 102 shown in FIG. 1. Stage 402 illustrates the smoothed sampled data 405 after additional computed points are added, data for some samples is modified, and/or some samples are deleted. The curve 405, for example, illustrates the smoothed sample data corresponding to the x and y parameters in table 310.

As described further below, the manner in which the sampled data 305 is changed into smoothed sampled data depends on the desired behavior and look for the final results. For instance, the sampled data in some embodiments is smoothed to generate a certain curve or certain visual effect such as creating a visual effect that the touch input was generated by a pen, a pencil, a paintbrush, etc.

B. Additional Input Parameters

Figure 5:
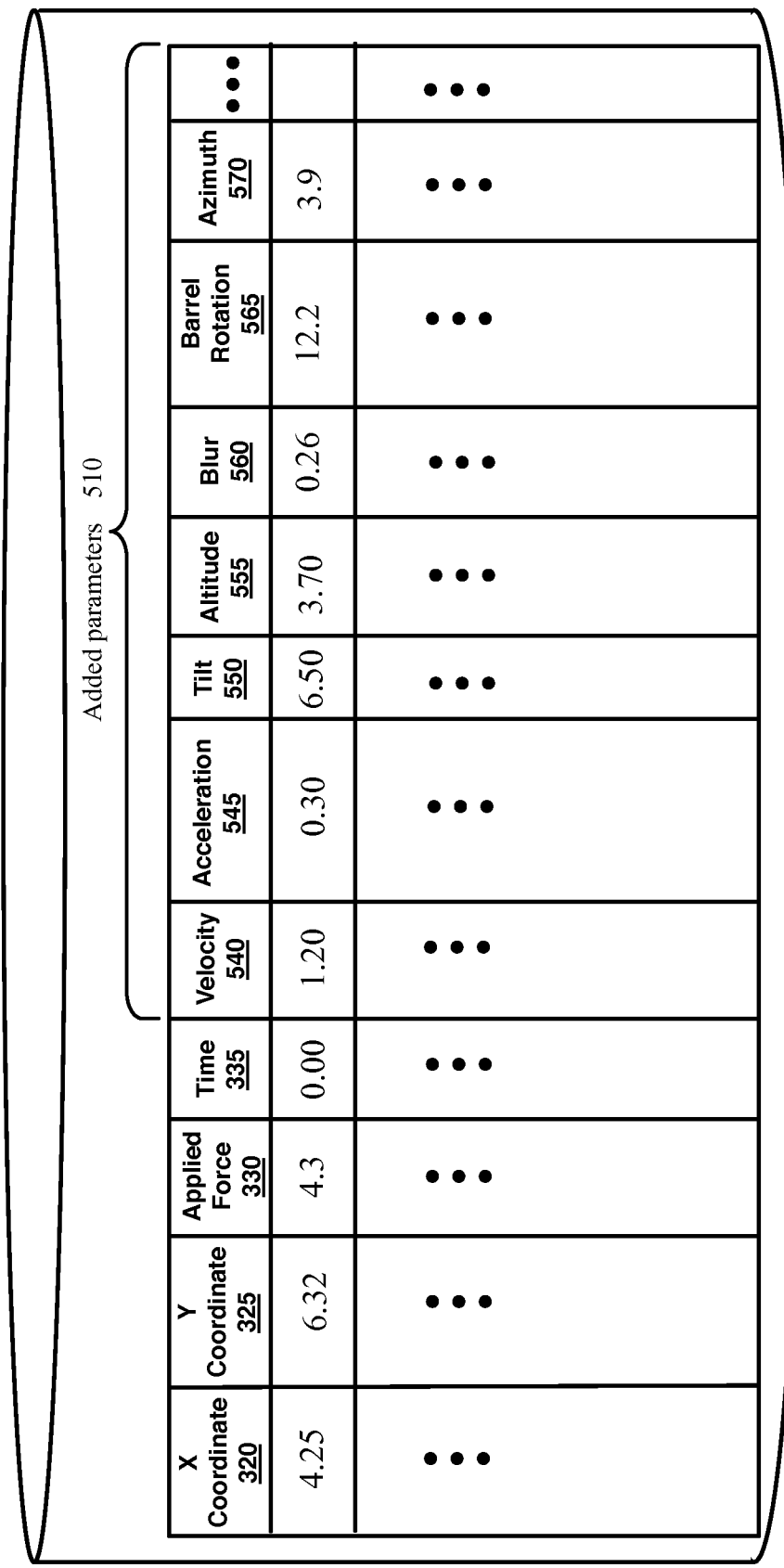
FIG. 5 illustrates examples of the parameters that are sampled or calculated after a touch input is received in some embodiments.

Some embodiments include additional parameters (other than x and y coordinates) that are either received from the touch input device as a result of receiving a touch input from the user or are calculated from other parameters. FIG. 5 illustrates examples of the parameters that are sampled or calculated after a touch input is received in some embodiments. Table 510 illustrates a set of parameters that are directly derived from a touch input device in some embodiments. These parameters include x coordinate 320, y coordinate 325, applied force 330, and time 335 as described above by reference to FIG. 3.

As shown, additional parameters 510 are either received from the touch input device (depending on the technology used) as a result of receiving a touch input from the user or are calculated from other parameters. These parameters include velocity 540, acceleration 545, tilt 550, altitude 555, blur 560, barrel rotation 565, azimuth 570, etc. For instance, velocity parameter shows the speed of entering the touch input (e.g., the speed of the user finger's movement on the touch input device). Acceleration is the acceleration of entering the touch input (e.g., the acceleration of the user's finger on the touch input device) during the touch entry. In some embodiments, parameters such as tilt, barrel rotation, and azimuth are received as an input when a stylus pen is used to generate the touch input. For instance, when a touchpad plane is used as a reference plane, the altitude is the angle between the body of the pen and the pen's projection on the reference plane. Azimuth is the angle between the pen's projection on the reference plane and a reference vector on the plane. Tilt refers to the angle of the pen during the touch input. Blur, as described further below, is calculated as a function of the coordinates and the velocity of the user's finger or the stylus during the touch input. Barrel rotation refers to the rotation of a pen's tip (e.g., the tip of a paintbrush) during the movement of the pen.

In some embodiments, the digitized sampled input data is used by a software drawing framework that includes an application programming interface (API). The drawing framework is utilized by application developers to develop software applications that require receiving input from a touch input device and display and/or process the received input. For instance, the drawing framework can be compiled with and/or linked to a software application that requires a person to enter a signature through a touch input device in order to authorize a transaction. As another example, the drawing framework can be compiled with and/or linked to a software application that receives a person's input through a touch input device and simulates the received input on a display screen to look like a drawing by a paintbrush, a pen, or a pencil.

Figure 6:
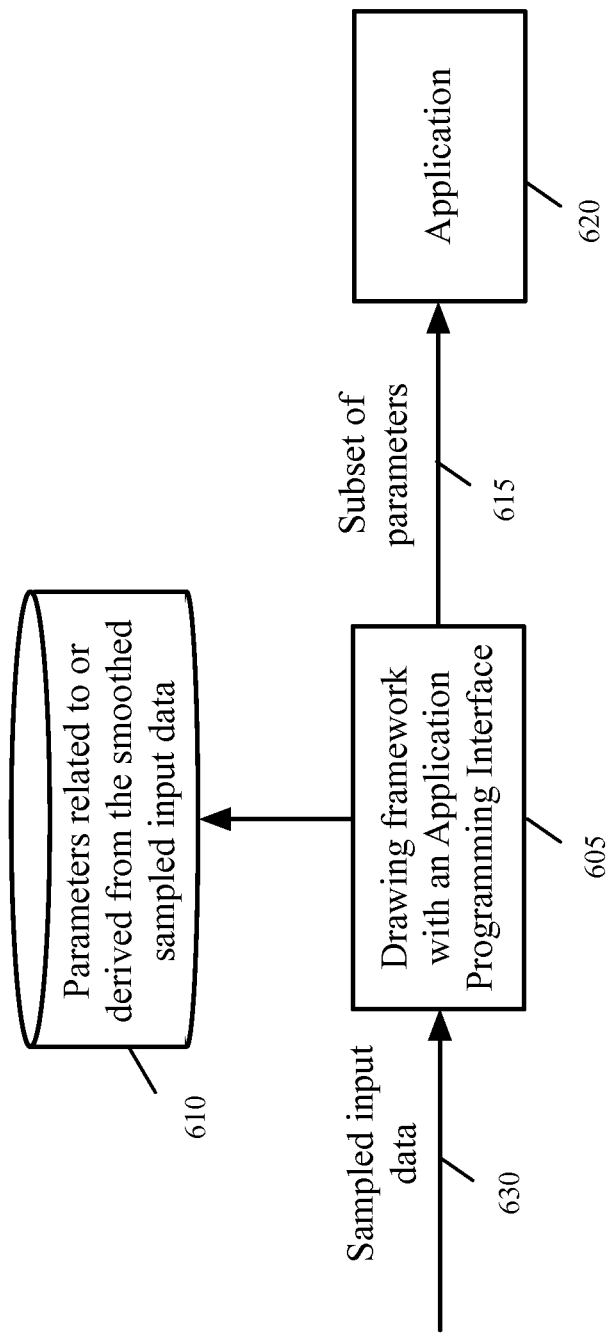
FIG. 6 conceptually illustrates a drawing framework that processes digitized sampled data of a touch input and provides a subset of the processed data through an API to an application in some embodiments.

FIG. 6 conceptually illustrates a drawing framework that processes digitized sampled data of a touch input device and provides a subset of the processed data through an API to an application in some embodiments. The drawing framework and the application in some embodiments are compiled and/or linked together. As shown, the drawing framework 605 receives sampled input data 630. The drawing framework processes the digitized sampled data and provides a subset 615 of the processed data to the application 620. The application, for example, can be a user interface (UI) application that receives data from a user touch input and displays, processes, and/or stores the data. For instance, an application for logographic alphabets displays and/or stores the logographic alphabets based on a user touch input.

As shown, the drawing framework 605 saves the processed data in one or more data structures 610. Processing of data includes smoothing the sampled data and calculating additional parameters based on the sampled data. In some embodiments, an application using the drawing framework provides a set of preferences to the drawing framework 605 (e.g., by providing one of more input parameters to the API included in the framework). For instance, one application may indicate a preference for data points to create a paintbrush (or brush) look (or visual effect) while another application might set a preference for data points to create a pen look. The drawing framework selects a subset 615 of the processed data based on the application preferences and sends the data through the API included in the framework to the application for further processing, display, and/or storage.

Figure 7:
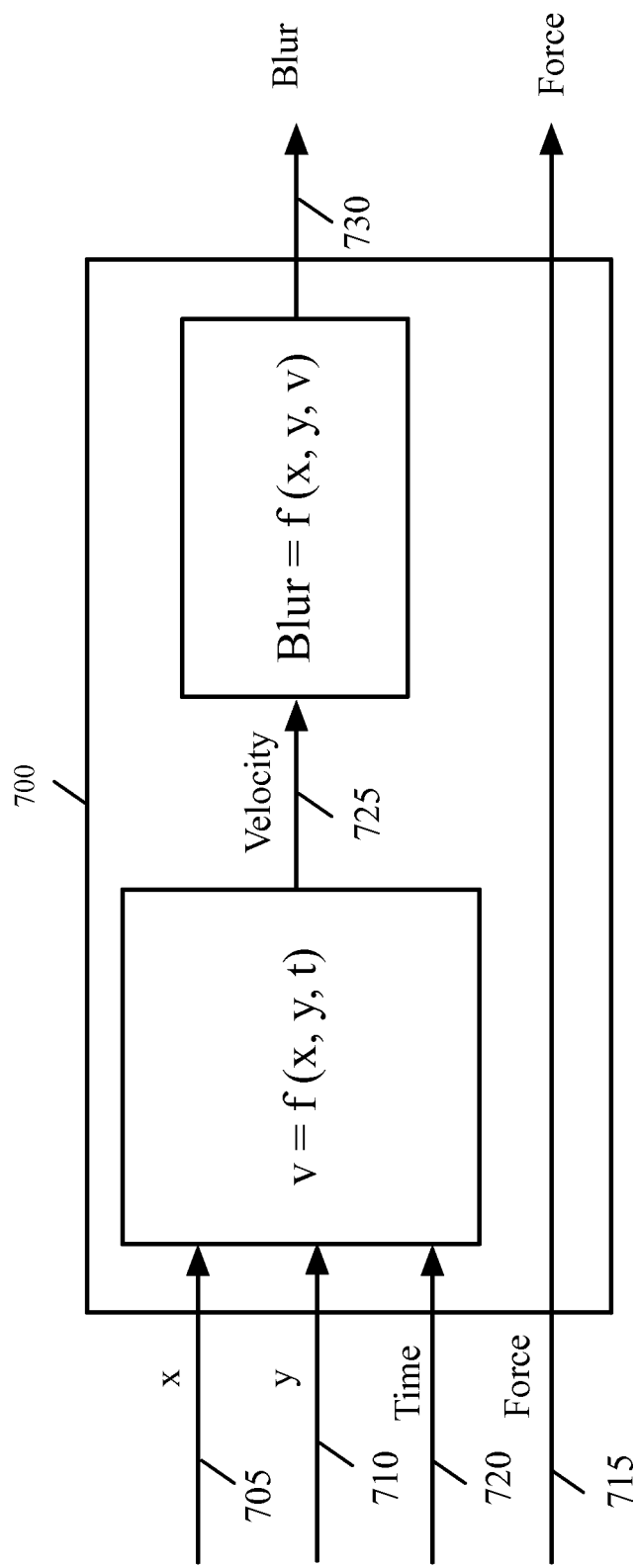
FIG. 7 conceptually illustrates an example of calculating additional parameters for a set of sampled data inputs by a drawing framework in some embodiments.

FIG. 7 conceptually illustrates an example of calculating additional parameters for a set of sampled data inputs by a drawing framework 700 in some embodiments. As shown, sampled data inputs 705-720 are received from a touch input device. The sampled input data includes x coordinates 705, y coordinates 710, force 715, and the time the samples are taken 720.

In addition, velocity 725 is calculated as a function of the x and y coordinates as well as the time each sample is taken. As shown, the drawing framework also generates additional data points 730 for a blur effect by applying a function to x, y, and velocity values. In this example, the force parameter is not used to calculate blur and is provided to the requesting application for displaying other visual effects.

The resulting data points 730 for blur are stored and provided to an application that requires data for displaying a blur effect. Depending on the function used to derive the blur parameter, the blur effect can be used to simulate the effects of rapid movement of an object (motion blur), to reduce an image noise, or to reduce an image details. The blur parameter can be in the form of a blur kernel (or blur convolution matrix), which is a matrix that can be used to change the value of a pixel at a location in an image as a function of the current value of the pixel and the values of a set of surrounding pixels.

In some embodiments, a parameter such as blur is provided by the drawing framework to all applications that are compiled with and/or linked to the drawing framework. In other embodiments, the drawings framework allows incorporation of user implemented extensions to the framework. In these embodiments, an application developer can extend the functionality of the drawing framework by providing a function to calculate a particular parameter such as blur.

Figure 8:
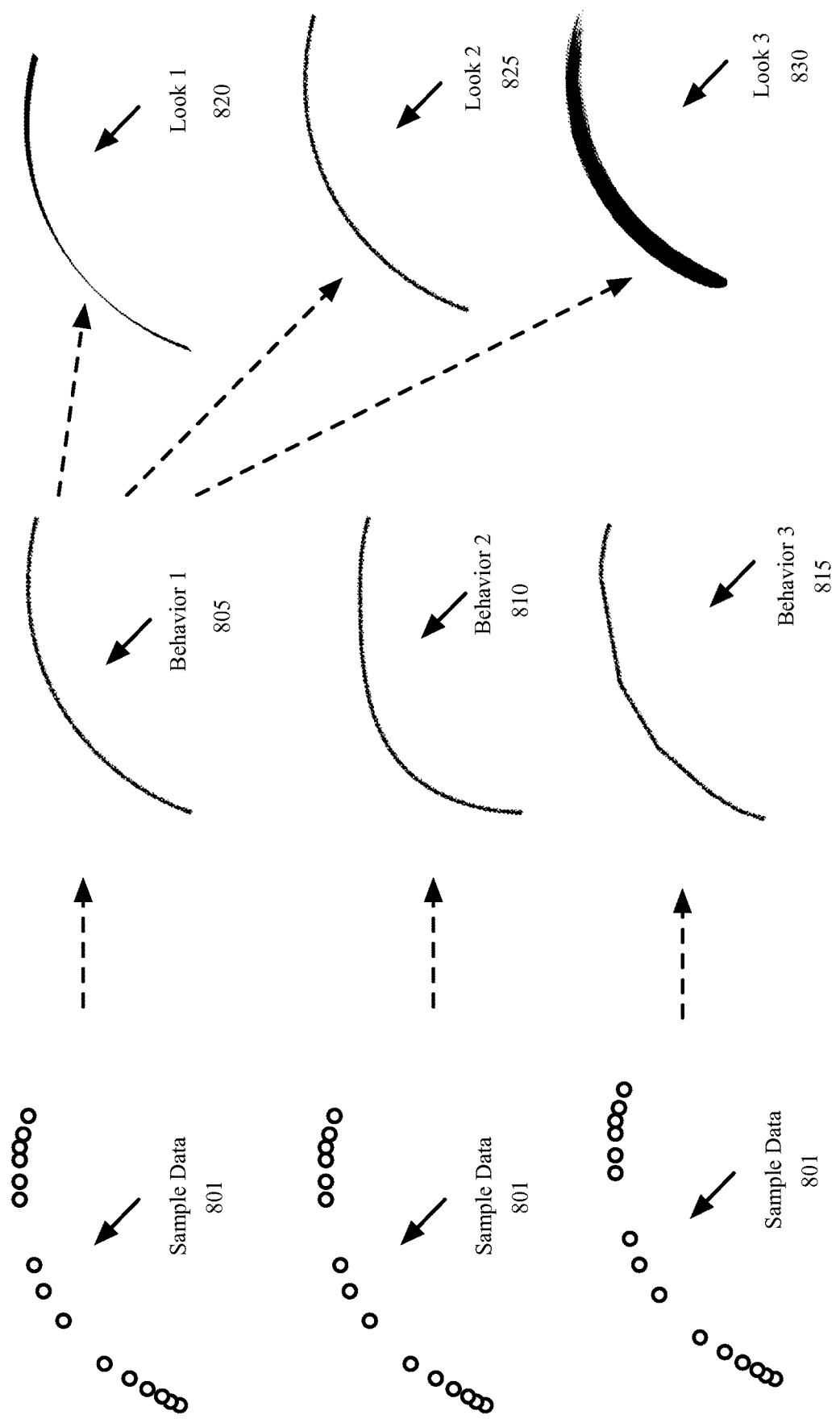
FIG. 8 conceptually illustrates processing sampled data for a touch input into a set of data points to simulate different pen behaviors and different output looks.

FIG. 8 conceptually illustrates processing sampled data for a touch input into a set of data points to simulate different pen behaviors and different output looks. Sampled data for a touch input is processed by smoothing the data (adding, modifying, deleting data points) to simulate a particular behavior. For instance, some embodiments utilize heuristics to analyze the sampled data to determine the movement of the user's finger or the stylus pen on the touchscreen or touchpad and add/modify/delete data points to recreate the path of the touch input (e.g., path 110 in FIG. 1).

As shown, the same (or similar) sampled data 801 results in smoothing the sampled data and adding/modifying/deleting data points to simulate different pen behaviors 805-815. Different behaviors represent different possible ways of processing the sampled data and therefore result in fundamentally different looks due to differences in the interpretation of the input. The drawing framework generates additional data points by adding/modifying/deleting sampled data points to create data points that correspond to different looks such as paintbrush, pen, pencil, etc.

As an example, subsets of the data points for "behavior 1" 805 are provided to different applications such that a receiving application (e.g., application 620 in FIG. 6) can generate one of the desired looks 820-830. It should be understood that the drawing framework 605 only generates different sets of data points and provides subsets of the data points to applications through the API provided by the framework. The shapes 820-830 are displayed by different applications that receive these data points. In other words, the API provides a uniform drawing framework where the same set of data points are provided to any application that intends to generate the same output look. The application can use the received data with or without further processing.

For instance, "for behavior 1 805", all applications that require generating a paintbrush look receive a subset of the smoothed sampled data points to generate a curve such as curve 830.

An application can display a shape solely based on the data received through the API without further processing the received data. An application can also perform additional processing to the data received through the API before displaying the processed data. For instance, an application can receive a subset of smoothed sampled data points (that includes data for a calculated blur parameter) to create a paintbrush look. The application can apply the blur parameter to create a paintbrush look with a blur effect, the application can ignore the blur parameter and display a paintbrush look without the blur effect, or the application can display two shapes from the same set of data points at the same time: one shape with the blur effect and one shape without the blur effect.

C. Vector Data and Raster Data

An application's preferences in some embodiments specify whether the subset of parameters sent by the API to the application should be in the form of a set of rasterized vertices or in the form of vector data. Vector data is made of several points and a set of mathematical formulas that indicate how and in what order the points should be connected together to generate a desired shape. Two adjacent points on a shape can be connected by a line or a curve that is defined by a mathematical formula. For instance, a rectangle can be represented by the data for the four corners of the square and a set of rules that indicates for example, node 1 should be connected to node 2 by an straight line, etc.

Rasterized data, on the other hand, includes a set of individual points or vertices that together define a particular shape. For instance, each spatial location includes x and y coordinates as well as one or more of other parameters such as force, velocity, acceleration, etc. Resolution of a rasterized shape depends on the number of individual points used to define the shape.

FIG. 9 conceptually illustrates converting digitized samples of a touch input into vector data and providing the vector data to an application through an API in some embodiments. The figure is shown in two stages 901 and 902. Stage 901 shows that a set of sample data points is receives from a touch input device.

Stage 902 shows a set of data points 905 that are generated after sample data points 115 are smoothed and processed. In this example, an application (e.g., application 620 in FIG. 6) has specified a preference to receive vector data (e.g., by calling the API and providing a particular set of parameters). These data points (which may include coordinate data as well as data for other parameters such as one or more of the parameters shown in FIG. 5) are provided by the API to the application along with a set of mathematical formulas that specify how each two adjacent points are connected to each other. For instance, the API provides a quadratic formula to application 620 to create sections of curve 910 between the data points 905. In other words, the vector data is provided to the application in the form of a set of continuous sections of a curve 910. The vector data for each section of the curve includes a set of data points and a formula such as a quadratic formula that indicates how the points are connected together and how additional points (if required) for the section can be generated based on the data points and the formula.

Figure 10:
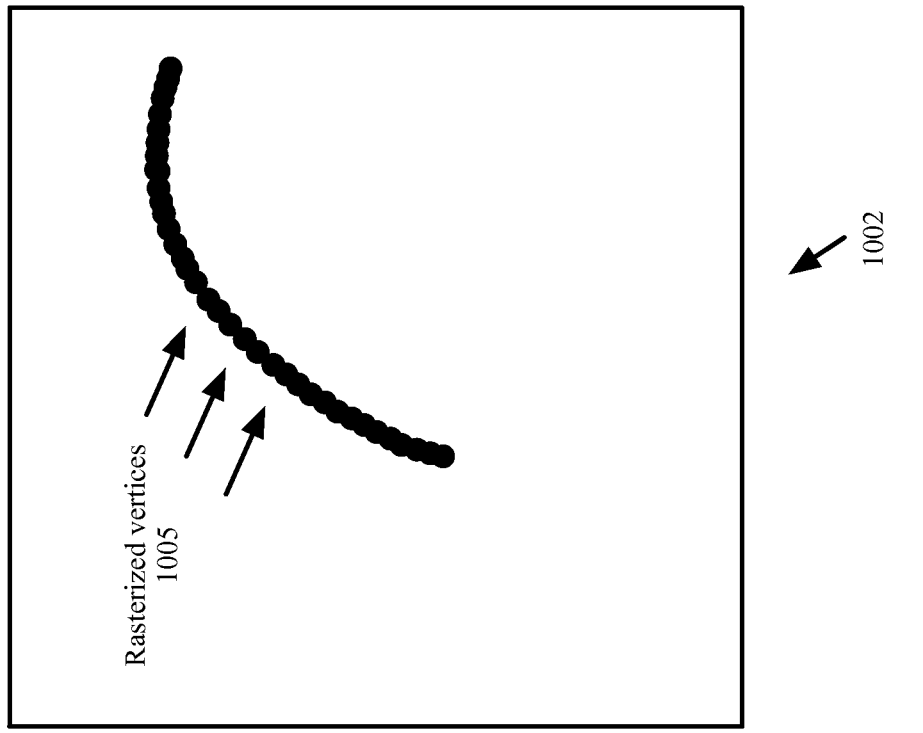
FIG. 10 conceptually illustrates converting digitized samples of a touch input into rasterized data and providing the vector data to an application through an API in some embodiments.
Figure 10:
Figure 10:
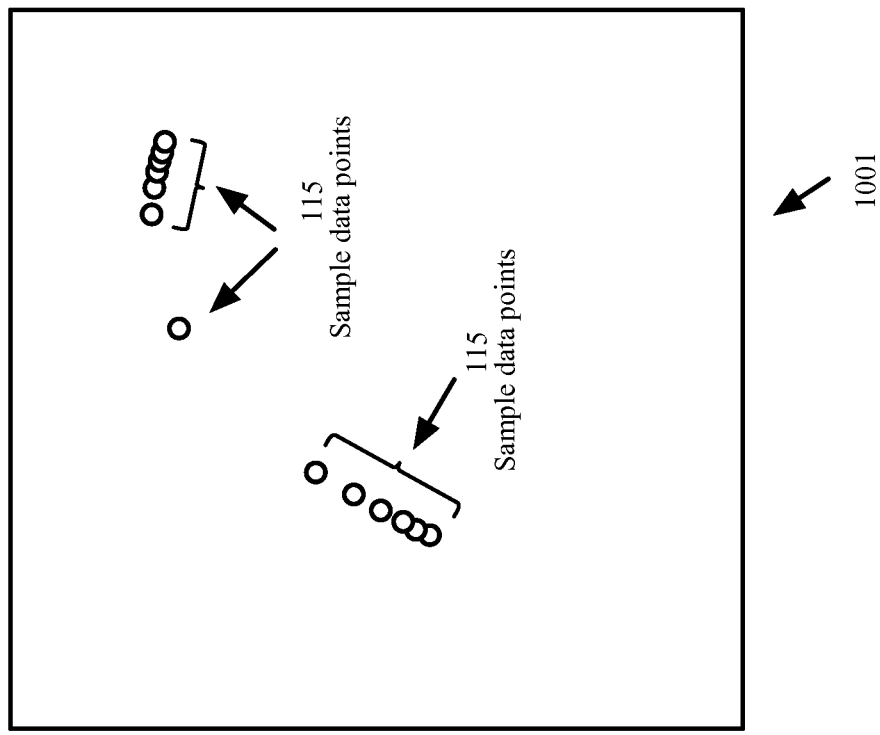

FIG. 10 conceptually illustrates converting digitized samples of a touch input into rasterized data and providing the vector data to an application through an API in some embodiments. The figure is shown in two stages 1001 and 1002. Stage 1001 shows that a set of sample data points 115 are received from a touch input device. Sampled data points 1001 are the same as sampled data points 115 in stage 901 of FIG. 9. In FIG. 10, however, the API outputs a set of rasterized vertices to an application (e.g., application 620 in FIG. 6). In this example, application 620 has specified a preference to receive rasterized data. The data points provided by the API are utilized by the application, for example, to draw a shape or to store the data for future use.

Some embodiments utilize the same formula to generate rasterized data points as the formula that is used for the vector data. The difference is the rasterized data are calculated by the framework and provided to the applications as a collection of data points. On the other hand, the vector data is provided to the applications as a more limited set of data points together with formulas needed to draw a curve between the adjacent data points (and generate additional points by the receiving application if required).

Data points 905 and 1005 in FIGS. 9 and 10 include additional parameters besides the x and y coordinates. Additional parameters in some embodiments include one or more additional parameters such as force, time, velocity, acceleration, tilt, altitude, blur, barrel rotation, azimuth, etc. Depending on an application's preference and/or the capabilities of the touch input device, the API selects a set of these parameters for each data point and passes the data points to the applications.

D. Creating Different Output Looks for the Same Set of Sampled Data Points

Figure 11:
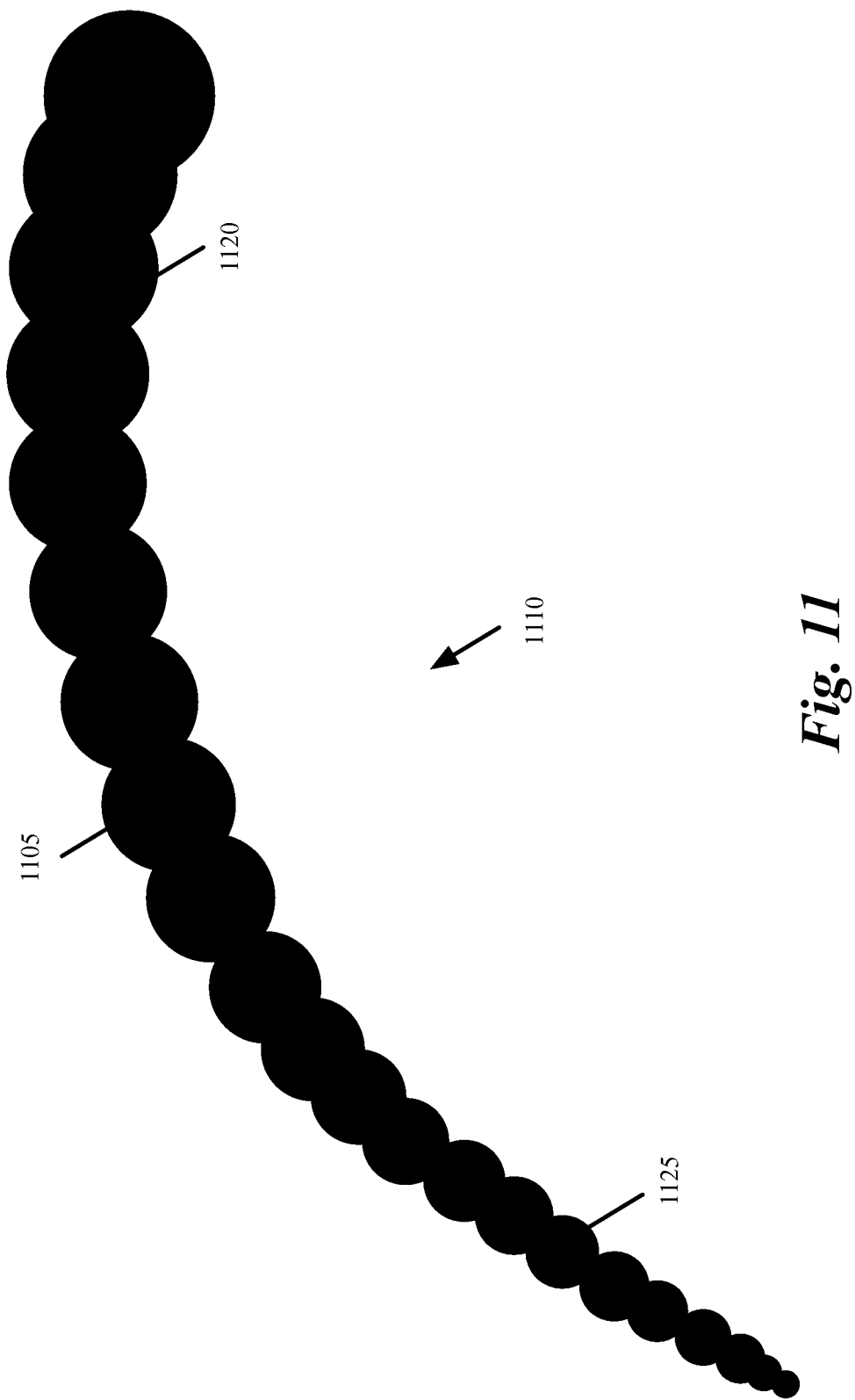
FIG. 11 conceptually illustrates a set of shapes displayed by an application based on data received from an API in some embodiments.

FIG. 11 conceptually illustrates a set of shapes displayed by an application based on data received from an API in some embodiments. In this example, the API provides x and y coordinates as well as force to the application. The application uses the data received from the API and draws the shapes based on the received data. In this example, each shape (such as shape 1105) is drawn as a circle and the radius of each circle is proportional to the force that the touch input device received at the corresponding x and y coordinates.

In operation, the displayed curve 1110 may have more shapes in order to provide a smoother look. In this example, fewer shapes are shown to emphasize that a shape associated with a larger force is drawn with a larger radius than a shape that is associated with a smaller force. For instance, shape 1120 is associated with a larger force applied at the corresponding x and y coordinates of the touch input device than shape 1125. As a result, the application has drawn shape 1120 with a larger radius than shape 1125. Other applications may use a different subset of smoothed data points or may use parameters other than force to manipulate the size or shape of the displayed shapes, which would result in curves with different looks.

FIGS. 12A and 12B conceptually illustrate providing different subsets of smoothed data to different applications to create different looks. As shown in FIG. 12A, the API generates a set of data points 1205 by smoothing the sampled data points of the touch input device. The data points 1205 include coordinates and one or more additional parameters as described above by reference to FIGS. 9 and 10.

When an application (such as application 620 in FIG. 6) requests data points for the touch input, the API provides a subset of the data points 1205 and/or a subset of the associated parameters of each data point based on the particular application's preference to generate a desired look. In the example of FIG. 12A, the subset 1205 of data points sent to an application are used by the application to generate a paintbrush look 1210.

As shown in FIG. 12B, the API sends a different subset 1215 of the smoothed data points to an application that generates a pen look 1220. For instance, data points sent to the application that generates a paintbrush look might include more data points to emulate a paintbrush. On the other hand, data points sent to the application that generates a pen look might include less data points to enable the requesting application to create a thinner shape to emulate a pen. Also, some embodiments send different types of parameters to different applications even when a similar input is received from the touch input device. For instance, some embodiments may provide an additional parameter such as blur to the application that emulates a paintbrush to create an artistic look while the application that emulate a pen may not receive the blur parameter.

Figure 13A:
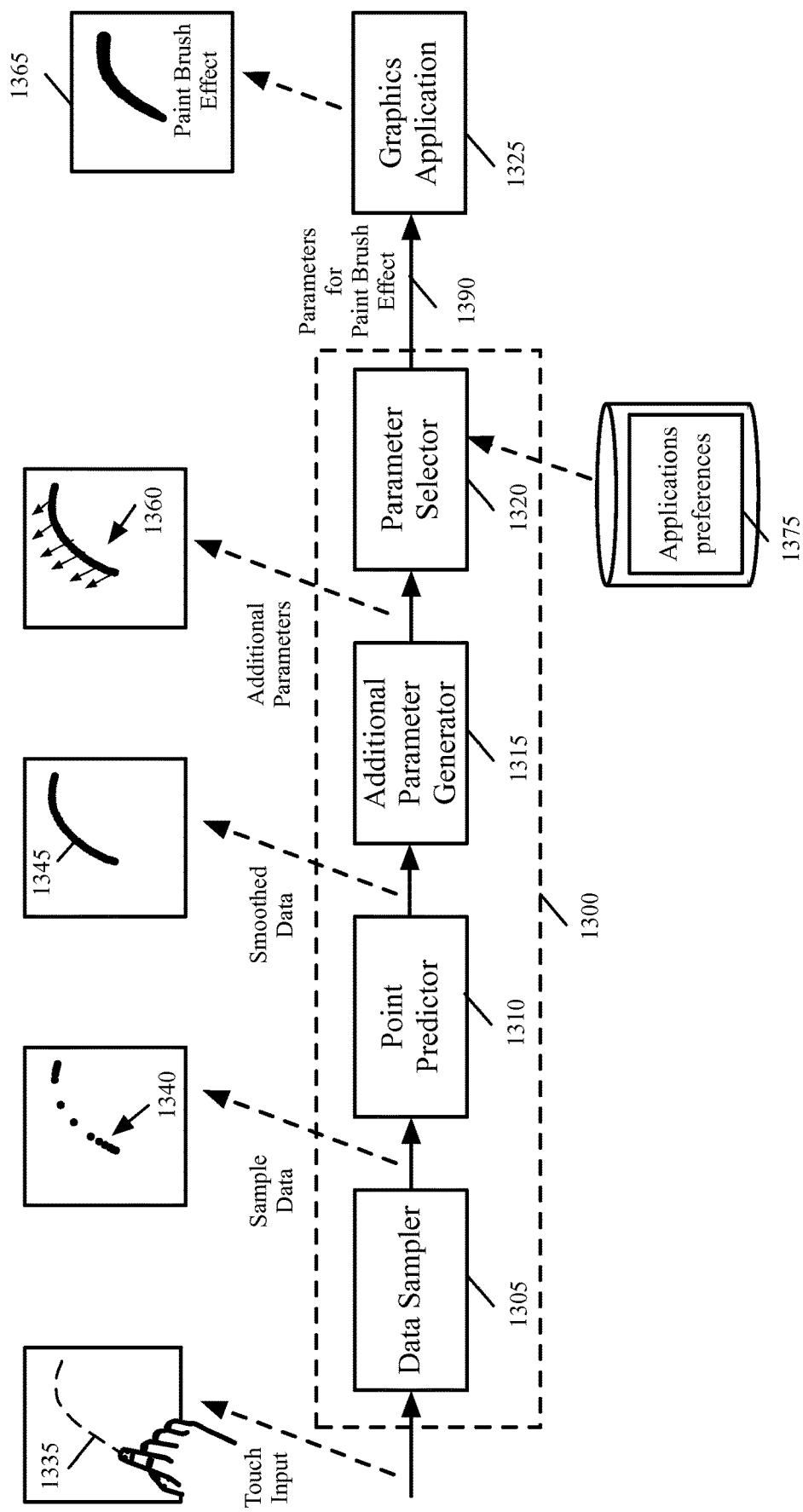
FIGS. 13A and 13B conceptually illustrate a unified drawing framework in some embodiments.
Figure 13B:
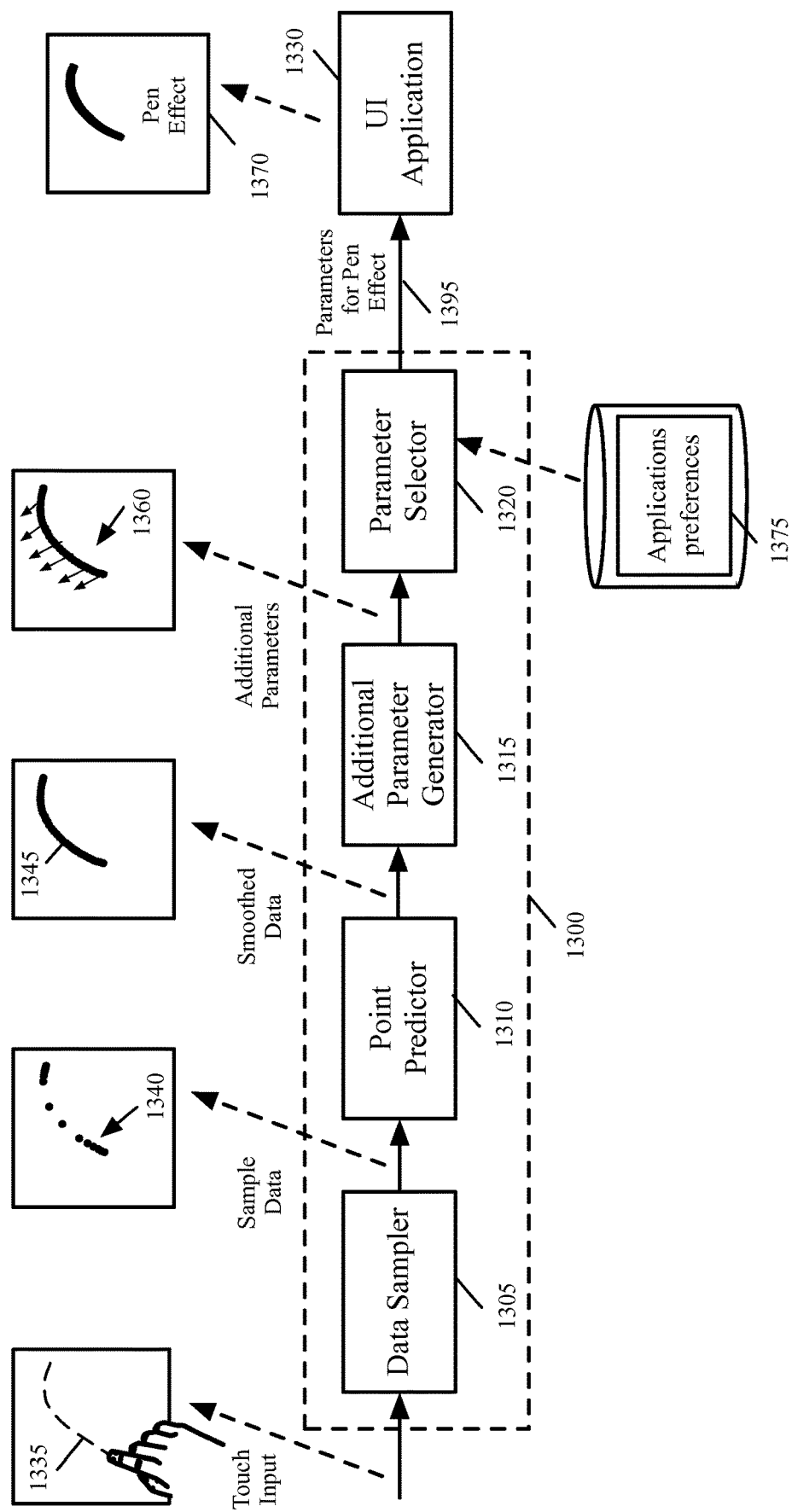

FIGS. 13A and 13B conceptually illustrate a unified drawing framework in some embodiments. As shown the framework 1300 includes a data sampler 1305, a point predictor 1310, an additional parameter generator 1315, and a parameter selector 1320. In some embodiments, the data sampler (or digitizer) 1305 is a component separate from the framework 1300.

As shown in FIG. 13A, when a user provides a touch input 1335 either by using a finger touch or a stylus pen, the data sampler takes sample data 1340. The sample data in different embodiments are taken at regular or variable intervals. Due to different speed of the user hand's movement, the digitized samples 1340 are not uniformly spaced. The point predictor 1310 smoothes the sampled data by calculating additional data points, deleting or modifying outliers to provide a set of smoothed data points 1345 that emulate the behavior of the user's touch input.

Additional parameter generator 1315 calculates additional parameters such as velocity and acceleration for each data point. The framework stores the parameters 1360 in vector data structures and/or data structures for a set of rasterized vertices. The framework 1300 and application 1325 are compiled and/or linked together in some embodiments. The framework also receives a set of preferences 1375 such as the required parameters, a particular output look (e.g., paintbrush, pen, pencil, etc.), and whether the data points should be in vector or rasterized format.

Once the application 1325 requests data for a touch input, the framework provides a subset 1390 of parameters 1360 to the application based on the application's preferences. It should be understood that the details of framework 1300 such as the operations of the data sampler, point predictor, additional parameter generator, parameter selector, etc., are hidden from application 1325 and the parameters required by the application are provided by the framework through an API that hides the underlying operations of the framework from the application 1325. As shown, application 1325, which is a graphics application, utilizes the parameters for paintbrush effect to display the touch input 1335 with a paintbrush look 1365.

As shown in FIG. 13B, a user has provided the same or similar touch input 1335 as in FIG. 13A. In FIG. 13B, however, application 1330 is a UI application that creates a pen effect. The framework provides a subset 1395 of parameters 1360 to the application to create a pen effect 1370. The subset 1395 of parameters in FIG. 13B may include a different number of data points and/or different types of parameters than the subset 1390 of parameters in FIG. 13A.

Figure 14:
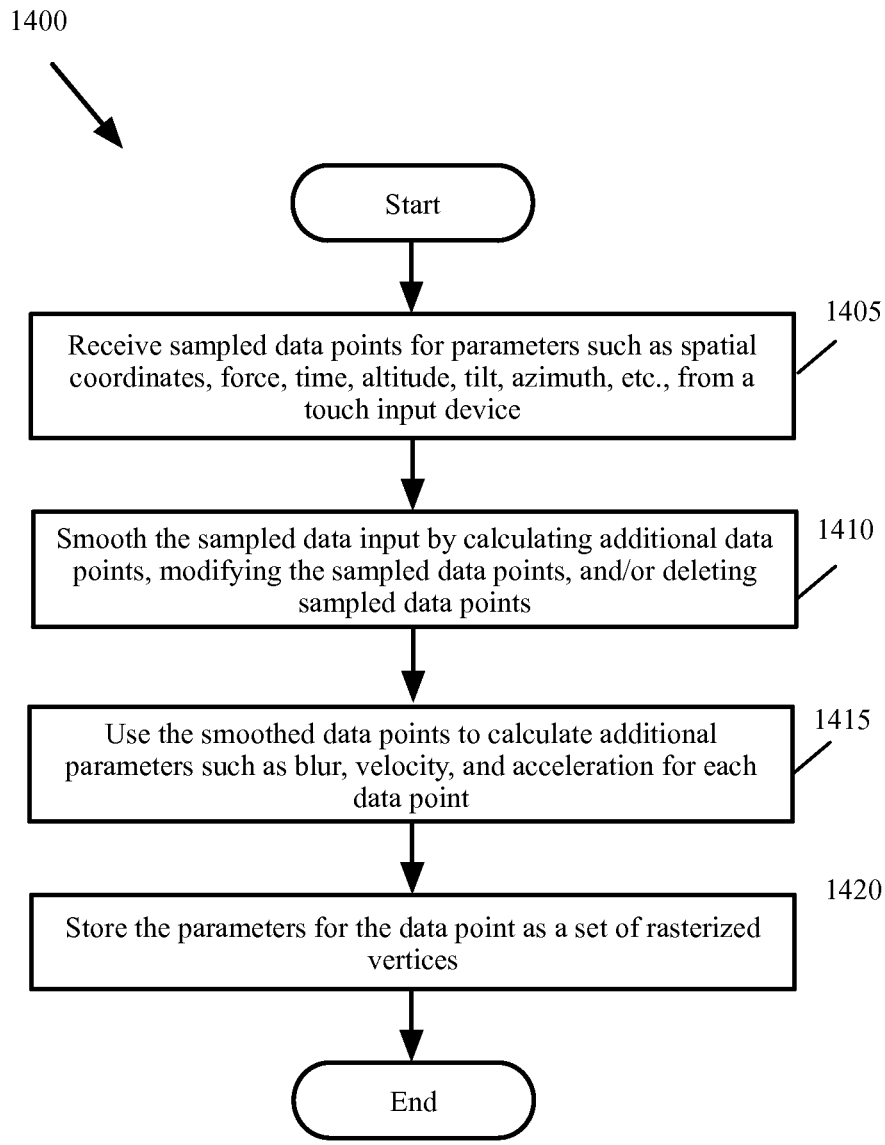
FIG. 14 conceptually illustrates a process for processing touch input data and storing the processed data in the form of rasterized data points in some embodiments.

FIG. 14 conceptually illustrates a process 1400 for processing touch input data and storing the processed data in the form of rasterized data points in some embodiments. Process 1400 in some embodiments is performed by a framework such as framework 605 in FIG. 6 or framework 1300 in FIGS. 13A and 13B.

As shown, the process receives (at 1405) sampled data points for parameters such as spatial coordinates, force, time, altitude, tilt, azimuth, etc., from a touch input device. The touch input is received when a person uses a finger or a stylus pen to generate a touch input such as the touch input described above by reference to FIG. 1. The process then smoothes (at 1410) the sampled data input by calculating additional data points, modifying the sampled data points, and/or deleting sampled data points as described above by reference to FIGS. 3, 4, and 17.

The process then uses (at 1415) the smoothed data points to calculate additional parameters such as blur, velocity, and acceleration for each data point as described above by reference to FIG. 7. The process then stores (at 1420) the parameters for the data points as a set of rasterized vertices as described above by reference to FIG. 10. The process then ends.

Figure 15:
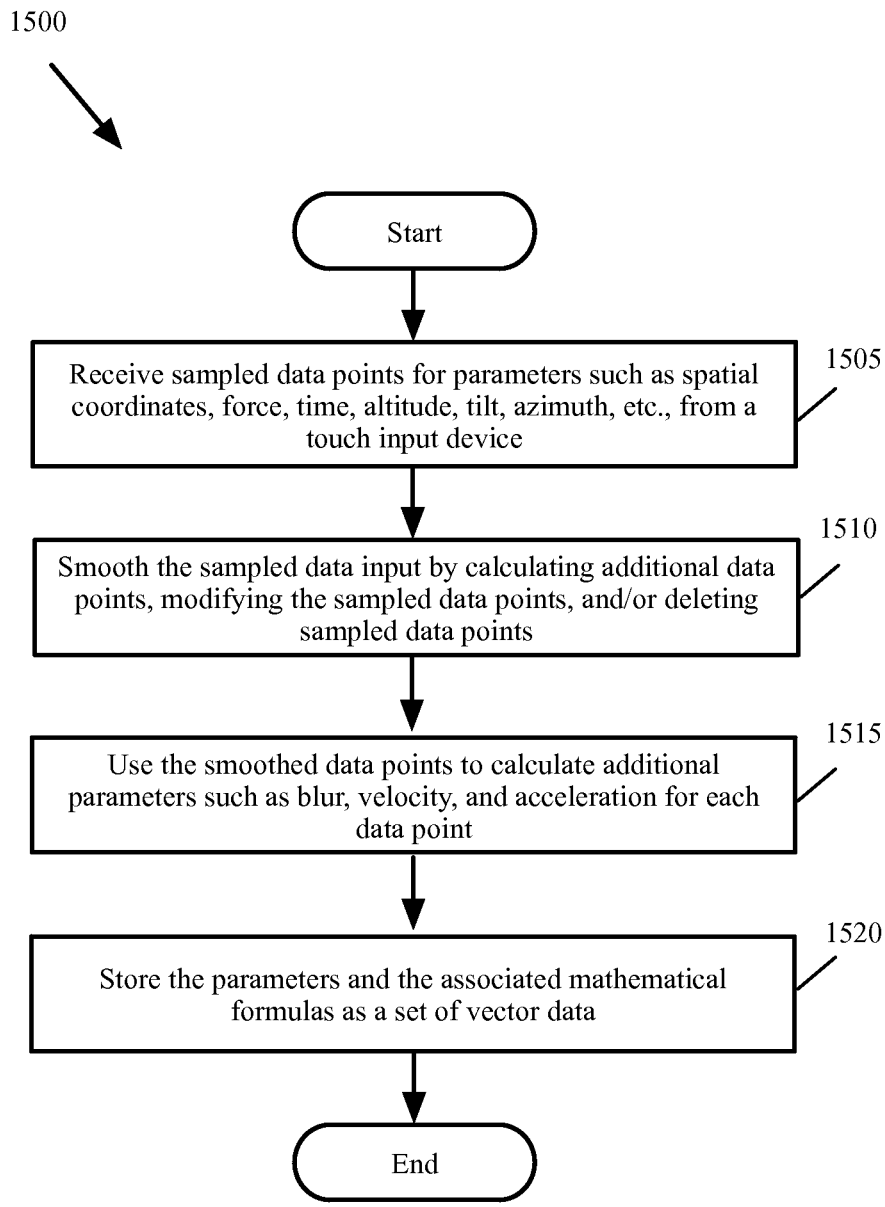
FIG. 15 conceptually illustrates a process for processing touch input data and storing the processed data in the form of vector data in some embodiments.

FIG. 15 conceptually illustrates a process 1500 for processing touch input data and storing the processed data in the form of vector data in some embodiments. Process 1500 in some embodiments is performed by a framework such as framework 605 in FIG. 6 or framework 1300 in FIGS. 13A and 13B.

As shown, the process receives (at 1505) sampled data points for parameters such as spatial coordinates, force, time, altitude, tilt, azimuth, etc., from a touch input device. The touch input is received when a person uses a finger or a stylus pen to generate a touch input such as the touch input described above by reference to FIG. 1. The process then smoothes (at 1510) the sampled data input by calculating additional data points, modifying the sampled data points, and/or deleting sampled data points as described above by reference to FIGS. 3, 4, and 17.

The process then uses (at 1515) the smoothed data points to calculate additional parameters such as blur, velocity, and acceleration for each data point as described above by reference to FIG. 7. The process then stores (at 1520) the parameters and the associated mathematical formulas as a set of vector data as described above by reference to FIG. 9. The process then ends.

Figure 16:
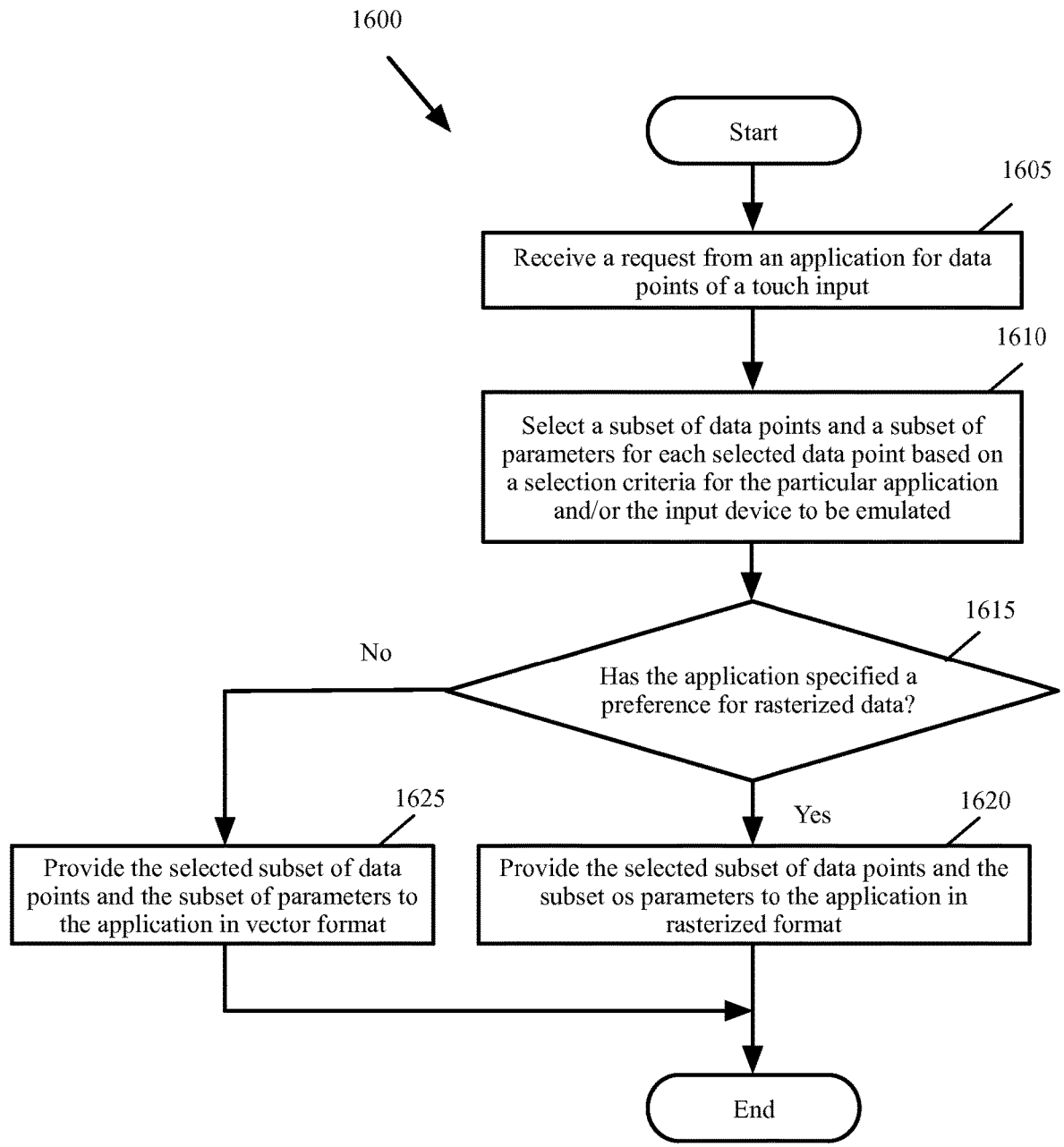
FIG. 16 conceptually illustrates a process for providing data for a touch input to an application in some embodiments.

FIG. 16 conceptually illustrates a process 1600 for providing data for a touch input to an application in some embodiments. Process 1600 in some embodiments is performed by a framework such as framework 605 in FIG. 6 or framework 1300 in FIGS. 13A and 13B.

As shown, the process receives (at 1605) a request (e.g., through the API of the framework) from an application for data points of a touch input. The process then selects a subset of data points generated for the touch input and a subset of the associated parameters based on a selection criteria for the particular application and/or the input device to be emulated. For instance, in some embodiments, the application has a set of preferences for a certain resolution (i.e., number of data points) as well as the associated parameters. In other embodiments, the subset of data points and the associated of parameters are selected based on the particular look that the requesting application generates.

The process then determines (at 1615) whether the requesting application has specified a preference for rasterized data. If yes, the process provides (at 1620) the selected subset of data points and subset of parameters to the application in rasterized format as described above by reference to FIG. 10. The process then ends.

Otherwise, the process provides (at 1625) the selected subset of data points and subset of parameters to the application in vector format as described above by reference to FIG. 9. The process then ends.

II. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
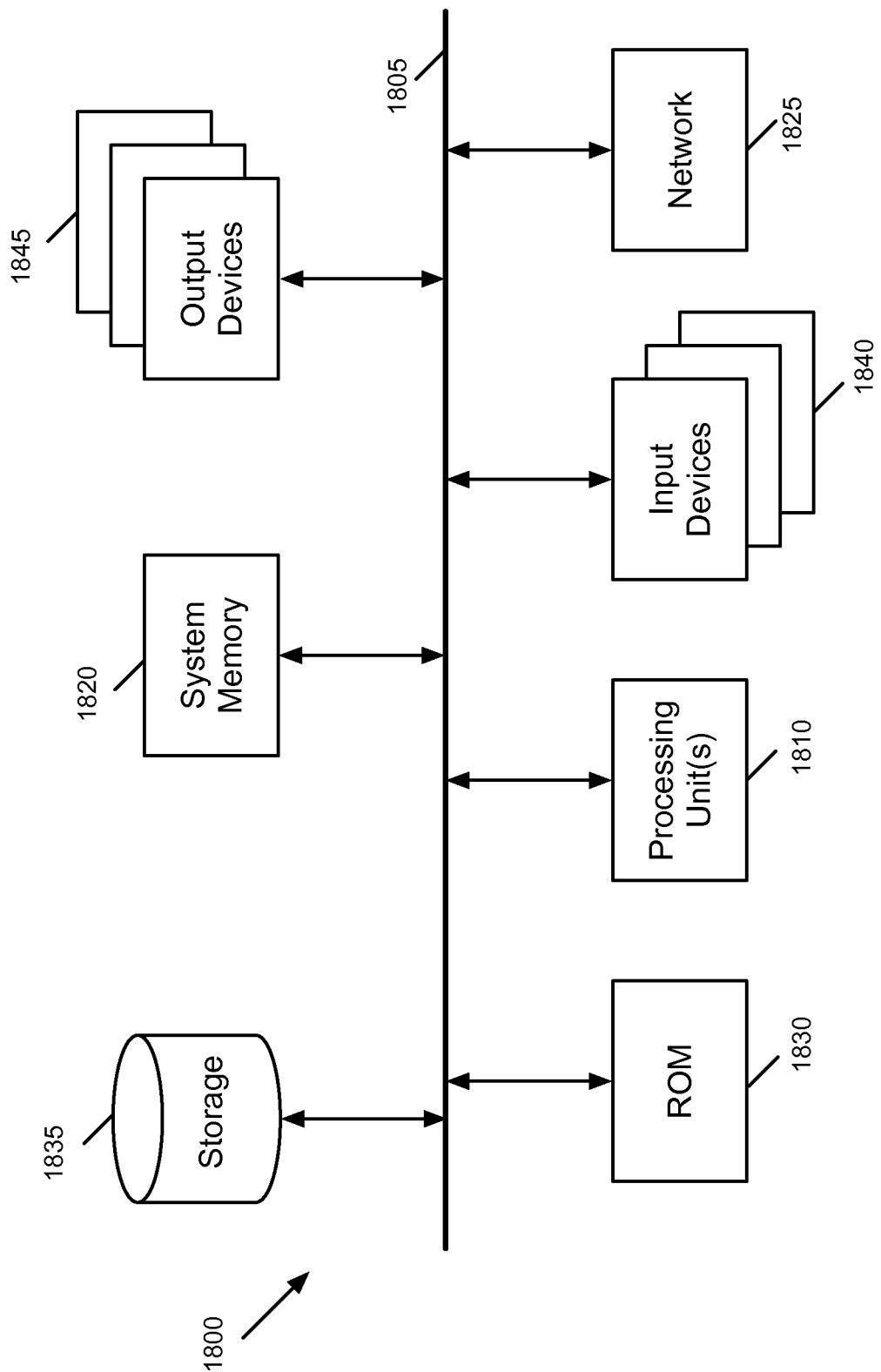
FIG. 18 conceptually illustrates an example of an electronic system with which some embodiments of the invention are implemented.

FIG. 18 conceptually illustrates an example of an electronic system 1800 with which some embodiments of the invention are implemented. The electronic system 1800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1800 includes a bus 1805, processing unit(s) 1810, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1820, and the permanent storage device 1835.

From these various memory units, the processing unit(s) 1810 retrieves instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive, integrated flash memory) as the permanent storage device 1835.

Other embodiments use a removable storage device (such as a floppy disk, flash memory device, etc., and its corresponding drive) as the permanent storage device. Like the permanent storage device 1835, the system memory 1820 is a read-and-write memory device. However, unlike storage device 1835, the system memory 1820 is a volatile readand-write memory, such as random access memory. The system memory 1820 stores some of the instructions and data that the processor needs at runtime. In some embodiments, the invention's processes are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1105 also connects to the input and output devices 1840 and 1845. The input devices 1840 enable the user to communicate information and select commands to the electronic system. The input devices 1840 include touch input devices such as touchscreens and touchpads, alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet), or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures such as FIGS. 14-16 conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of emulating an input device, the method comprising:

receiving, by one or more processors from a touch input device, a set of sampled data associated with a set of sampled data points of a touch input, the set of sampled data comprising a set of coordinates of each sampled data point, a force applied at each sampled data point, and a time the data for each sampled data point is received;

adding, by the one or more processors, a plurality of non-sampled data points to the set of sampled data points to create a set of smoothed data points to fit a curve through the set of smoothed data points, each added non-sampled data point associated with a predicted set of non-sampled data comprising a set of coordinates, a predicted force, and a time;

calculating, by the one or more processors, for each sampled and non-sampled data point in the set of smoothed data points, a set of parameters based on the set of sampled or non-sampled data associated with the sampled or non-sampled data point;

receiving, by the one or more processors, a selection criteria for an application, wherein the selection criteria specifies a subset of smoothed data points smaller than the set of smoothed data points and a subset of calculated parameters smaller than the set of parameters to be selected for use in displaying the touch input on a display with an output look emulating the input device; and selecting, by the one or more processors, the subset of smoothed data points from the set of smoothed data points and the subset of calculated parameters for the subset of smoothed data points based on the selection criteria to provide to the application, wherein the subset of smoothed data points directly includes the predicted force data associated with the plurality of non-sampled data points.

2. The method of claim 1, wherein adding the plurality of non-sampled data points to the set of sampled data points comprises:
generating, by the one or more processors, a mathematical function to fit the curve through the set of sampled data points; and
generating, by the one or more processors, the plurality of non-sampled data points using the mathematical function.

3. The method of claim 1, wherein the selection criteria indicates a resolution of the display, wherein the subset of smoothed data points is selected based on the resolution; and further comprising providing the subset of smoothed data points and the subset of calculated parameters for the subset of smoothed data points to the application.

4. The method of claim 1, wherein the calculated set of parameters comprises at least one of velocity, acceleration, tilt, altitude, blur, or azimuth.

5. The method of claim 1, wherein receiving the set of smoothed data points comprises sampling, by the one or more processors, the touch input device at a plurality of points in time.

6. The method of claim 1, wherein emulating the input device comprises emulating one of a pen, a pencil, or a paintbrush.

7. The method of claim 3, wherein the subset of smoothed data points and the subset of calculated parameters for the subset of smoothed data points are provided to the application, by the one or more processors, through an application programming interface (API).

8. A non-transitory computer readable medium storing a program for emulating an input device, the program executable by at least one processing unit, the program comprising sets of instructions for:
receiving, by the at least one processing unit from a touch input device, a set of sampled data associated with a set of sampled data points of a touch input, the set of sampled data comprising a set of coordinates of each sampled data point, a force applied at each sampled data point, and a time the data for each sampled data point is received;
adding, by the at least one processing unit, a plurality of non-sampled data points to the set of sampled data points to create a set of smoothed data points to fit a curve through the set of smoothed data points, each added non-sampled data point associated with a predicted set of non-sampled data comprising a set of coordinates, a predicted force, and a time;
calculating, by the at least one processing unit, for each sampled and non-sampled data point in the set of smoothed data points, a set of parameters based on the set of sampled or non-sampled data associated with the sampled or non-sampled data point;
receiving, by the at least one processing unit, a selection criteria for an application, wherein the selection criteria specifies a subset of smoothed data points smaller than the set of smoothed data points and a subset of calculated parameters smaller than the set of parameters to be selected for use in displaying the touch input on a display with an output look emulating the input device; and
selecting, by the at least one processing unit, the subset of smoothed data points and the subset of calculated parameters for the subset of smoothed data points based on the selection criteria to provide to the application, wherein the subset of smoothed data points directly includes the predicted force data associated with the plurality of non-sampled data points.

9. The non-transitory computer readable medium of claim 8, wherein the set of instructions for adding the plurality of non-sampled data points to the set of sampled data points comprises sets of instructions for:
generating, by the at least one processing unit, a mathematical function to fit the curve through the set of sampled data points; and
generating, by the at least one processing unit, the plurality of non-sampled data points using the mathematical function.

10. The non-transitory computer readable medium of claim 8, wherein the selection criteria indicates a resolution of the display, wherein the subset of smoothed data points is selected based on the resolution, and wherein the program further comprises sets of instructions for providing the subset of smoothed data points and the subset of calculated parameters for the subset of smoothed data points to the application.

11. The non-transitory computer readable medium of claim 8, wherein the calculated set of parameters comprises at least one of velocity, acceleration, tilt, altitude, blur, or azimuth.

12. The non-transitory computer readable medium of claim 8, wherein the set of instructions for receiving the set of smoothed data points comprises a set of instructions for sampling, by the at least one processing unit, the touch input device at a plurality of points in time.

13. The non-transitory computer readable medium of claim 8, wherein the set of instructions for emulating the input device comprises a set of instructions for emulating one of a pen, a pencil, or a paintbrush.

14. The non-transitory computer readable medium of claim 10, wherein the subset of smoothed data points and the subset of calculated parameters for the subset of smoothed data points are provided to the application, by the at least one processing unit, through an application programming interface (API).

15. A system comprising:
a set of processing units; and
a non-transitory computer readable medium storing a program for emulating an input device, the program executable by at least one of the processing units, the program comprising sets of instructions for:
receiving, by the at least one of the processing units from a touch input device, a set of sampled data associated with a set of sampled data points of a touch input, the set of sampled data comprising a set of coordinates of each sampled data point, a force applied at each sampled data point, and a time the data for each sampled data point is received,
adding, by the at least one of the processing units, a plurality of non-sampled data points to the set of sampled data points to create a set of smoothed data points to fit a curve through the set of smoothed data points, each added non-sampled data point associated with a predicted set of non-sampled data comprising a set of coordinates, a predicted force, and a time,
calculating, by the at least one of the processing units, for each sampled and non-sampled data point in the set of smoothed data points, a set of parameters based on the set of sampled or non-sampled data associated with the sampled or non-sampled data point, receiving, by the at least one processing units, a selection criteria for an application, wherein the selection criteria specifies a subset of smoothed data points smaller than the set of smoothed data points and a subset of calculated parameters smaller than the set of parameters to be selected for use in displaying the touch input on a display with an output look emulating the input device, and selecting, by the at least one of the processing units, the subset of smoothed data points from the set of smoothed data points and the subset of calculated parameters for the subset of smoothed data points based on the selection criteria to provide to the application, wherein the subset of smoothed data points directly includes the predicted force data associated with the plurality of non-sampled data points.

16. The system of claim 15, wherein the set of instructions for adding the plurality of non-sampled data points to the set of sampled data points comprises sets of instructions for:

generating, by the at least one of the processing units, a mathematical function to fit the curve through the set of sampled data points; and generating, by the at least one of the processing units, the plurality of non-sampled data points using the mathematical function.

17. The system of claim 15, wherein the selection criteria indicates a resolution of the display, wherein the subset of smoothed data points is selected based on the resolution, and wherein the program further comprises sets of instructions for providing the subset of smoothed data points and the subset of calculated parameters for the subset of smoothed data points to the application.

18. The system of claim 15, wherein the calculated set of parameters comprises at least one of velocity, acceleration, tilt, altitude, blur, or azimuth.

19. The system of claim 15, wherein the set of instructions for receiving the set of smoothed data points comprises a set of instructions for sampling, by the at least one of the processing units, the touch input device at a plurality of points in time.

20. The system of claim 15, wherein the set of instructions for emulating the input device comprises a set of instructions for emulating one of a pen, a pencil, or a paintbrush.

* * * * *